(12) United States Patent
Bequette

(10) Patent No.: US 7,416,234 B2
(45) Date of Patent: Aug. 26, 2008

(54) VEHICLE SLIDING FLOOR EXTENSION

(76) Inventor: Lawrence M. Bequette, 4261 Blueridge St., North Port, FL (US) 34287

( * ) Notice: Subject to any disclaimer, the term of this patent is extended or adjusted under 35 U.S.C. 154(b) by 374 days.

(21) Appl. No.: 11/256,383

(22) Filed: Oct. 21, 2005

(65) Prior Publication Data

US 2006/0033353 A1    Feb. 16, 2006

Related U.S. Application Data

(63) Continuation-in-part of application No. 10/883,248, filed on Jul. 2, 2004, now Pat. No. 6,976,720, which is a continuation-in-part of application No. 10/185,984, filed on Jul. 1, 2002, now abandoned, which is a continuation-in-part of application No. 10/068,541, filed on Feb. 8, 2002, now Pat. No. 6,503,036.

(51) Int. Cl.
    *B62C 1/06* (2006.01)
(52) U.S. Cl. ............... 296/26.09; 296/26.08; 296/39.2; 414/522
(58) Field of Classification Search ............. 296/28.08, 296/26.09, 26.13, 39.2; 414/522; 410/46; 224/403, 554
    See application file for complete search history.

(56) References Cited

U.S. PATENT DOCUMENTS

| | | |
|---|---|---|
| 4,027,892 A | 6/1977 | Parks |
| 4,941,784 A | 7/1990 | Flament |
| 5,513,941 A | 5/1996 | Kulas et al. |
| 5,549,428 A | 8/1996 | Yeatts |
| 5,915,773 A | 6/1999 | Deutsch et al. |
| 5,938,262 A | 8/1999 | Mills |
| 6,065,792 A | 5/2000 | Sciullo et al. |
| 6,244,802 B1 | 6/2001 | Stanesic et al. |
| 6,312,034 B1 | 11/2001 | Coleman et al. |
| 6,390,525 B2 | 5/2002 | Carpenter et al. |
| 6,503,036 B1 | 1/2003 | Bequette et al. |
| 6,530,730 B2 | 3/2003 | Swensen |
| 6,648,569 B2 | 11/2003 | Douglass et al. |
| 6,918,721 B2 | 7/2005 | Venton-Walters et al. |
| 6,976,720 B1 * | 12/2005 | Bequette .................. 296/26.09 |
| 2002/0119023 A1 | 8/2002 | Delay |

* cited by examiner

*Primary Examiner*—Stephen Gordon
(74) *Attorney, Agent, or Firm*—Dennis G. LaPointe

(57) ABSTRACT

An extendable vehicle cargo floor assembly that includes a semi-rigid material panel base and a slideable panel that slides between guides so as to provide easy access to cargo stored in the vehicle storage part. In another embodiment, the panels are segmented in parts and joined together at installation. In another embodiment, the base panel is not used and instead, a bedliner is configured to operate as the base panel.

5 Claims, 25 Drawing Sheets

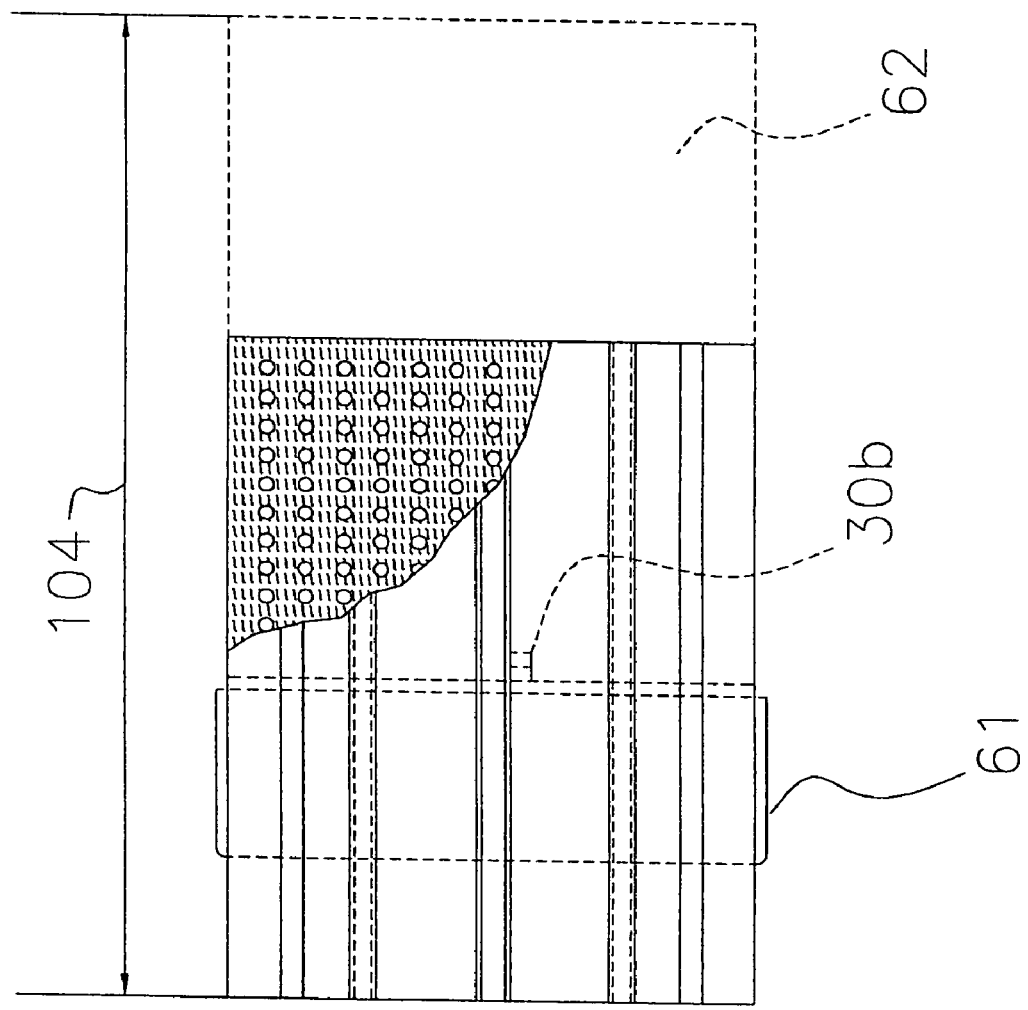

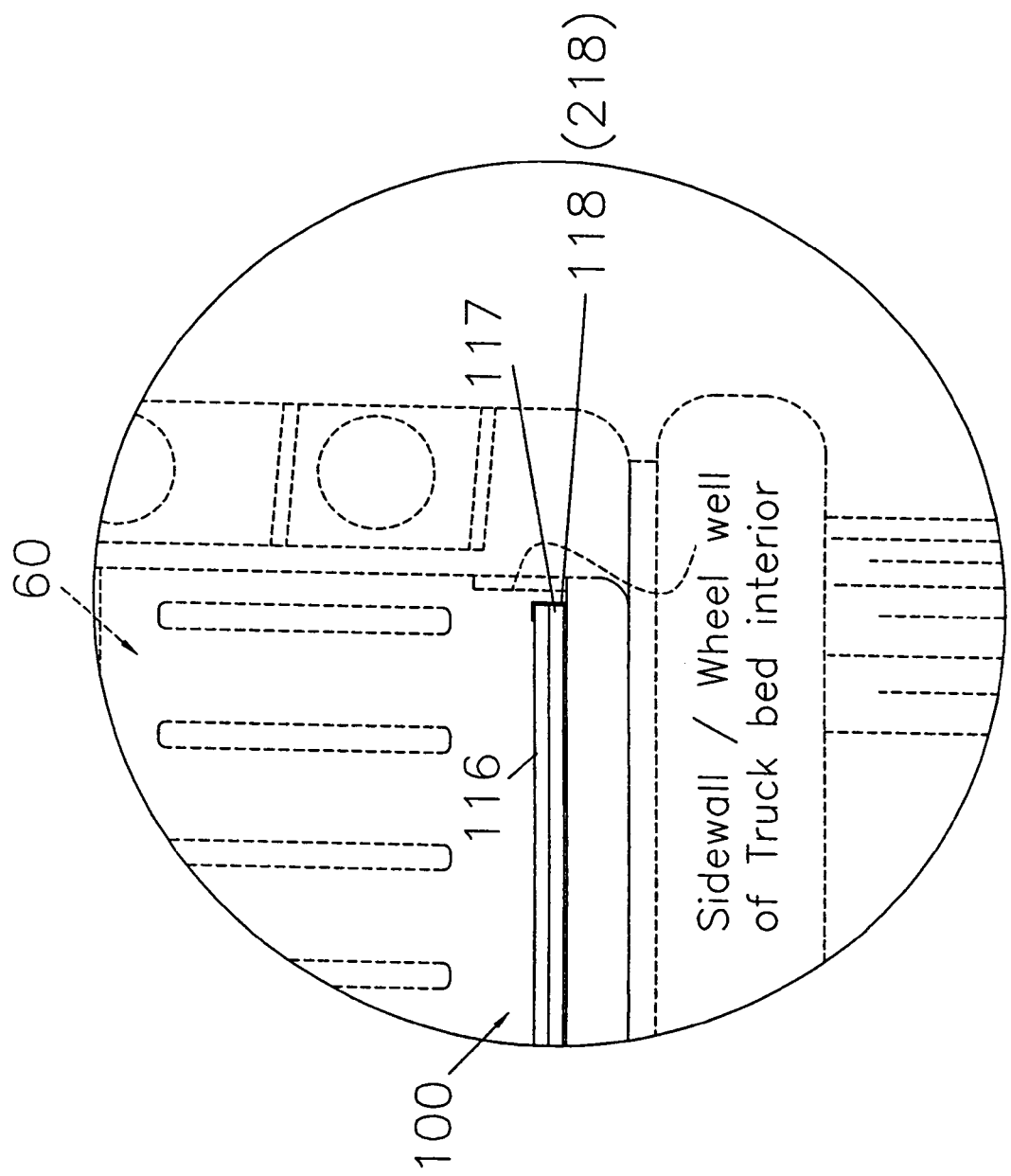

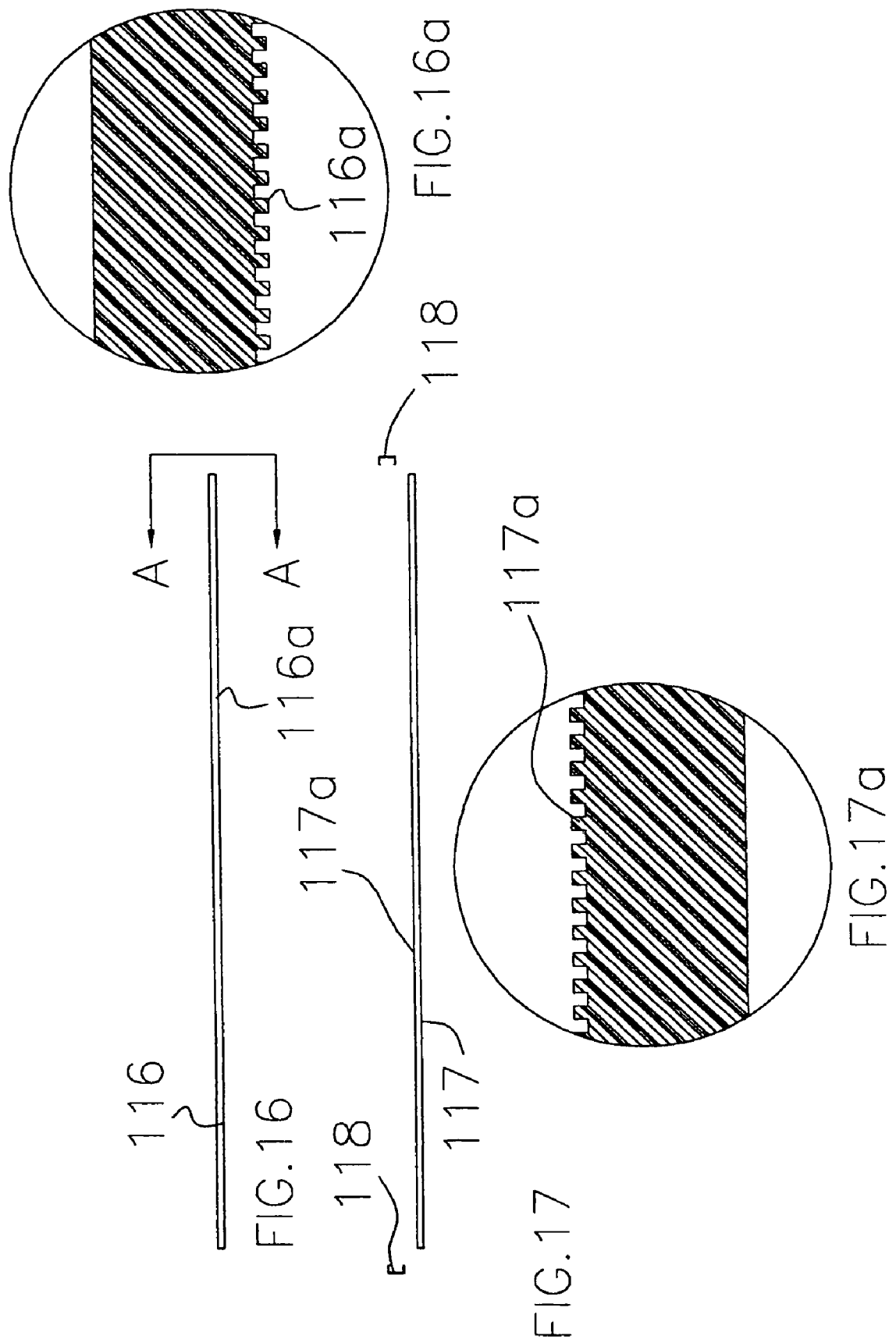

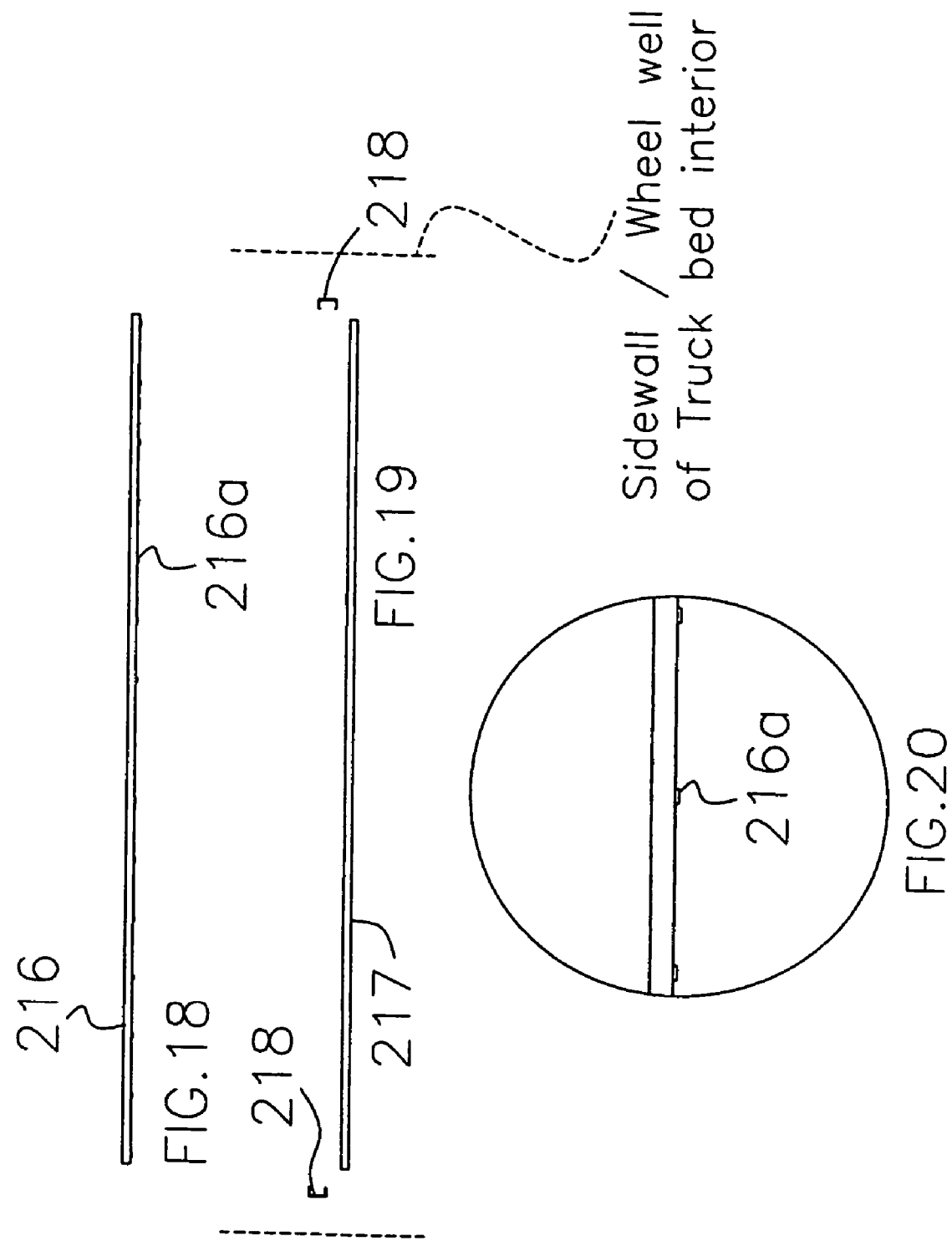

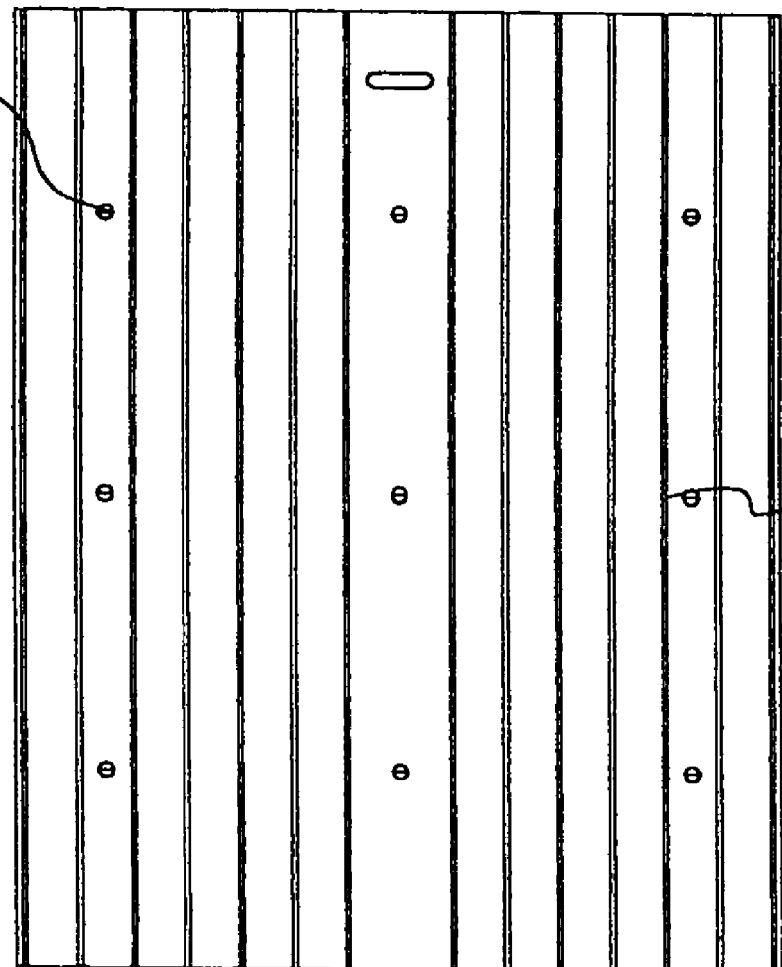

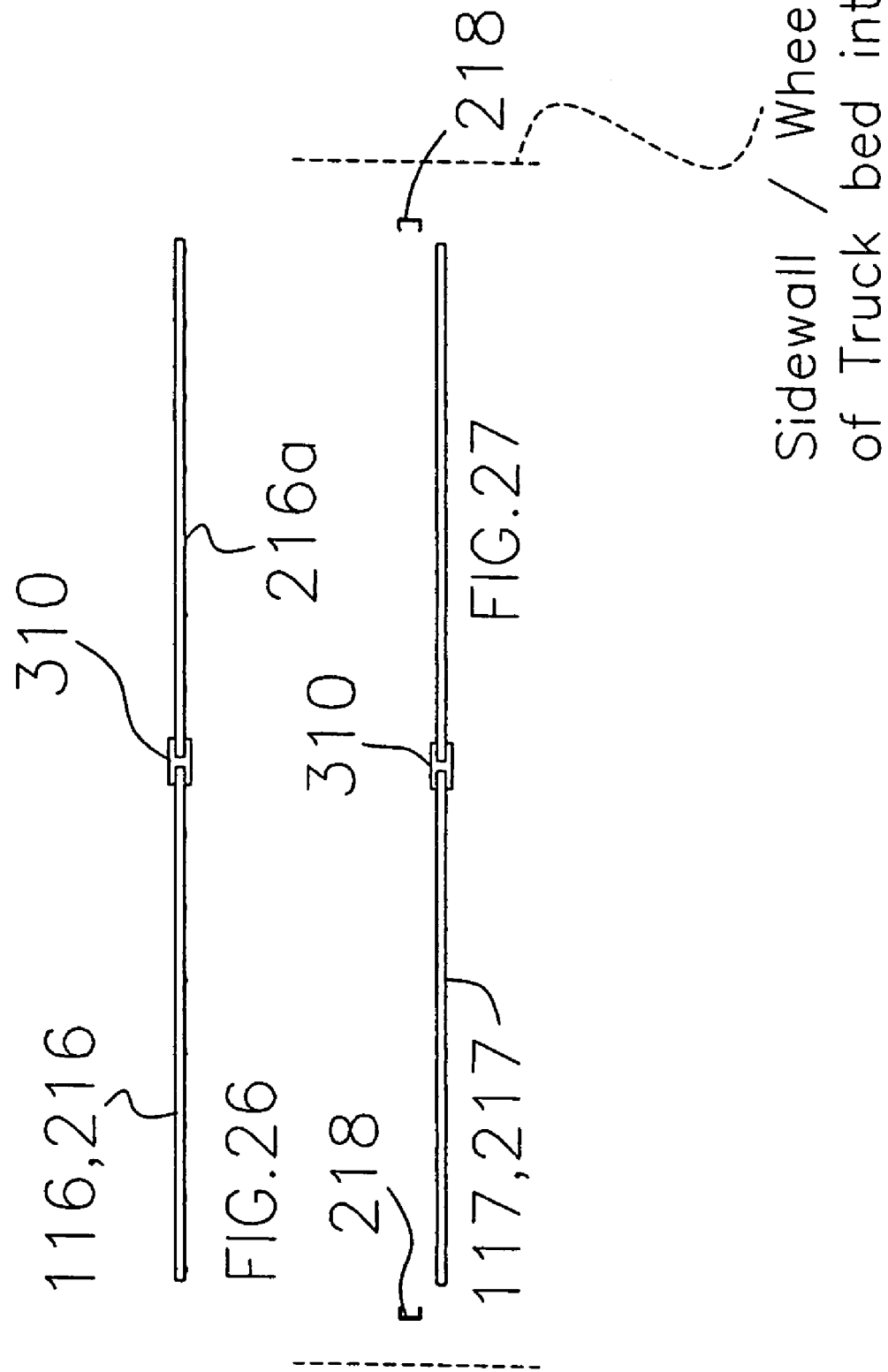

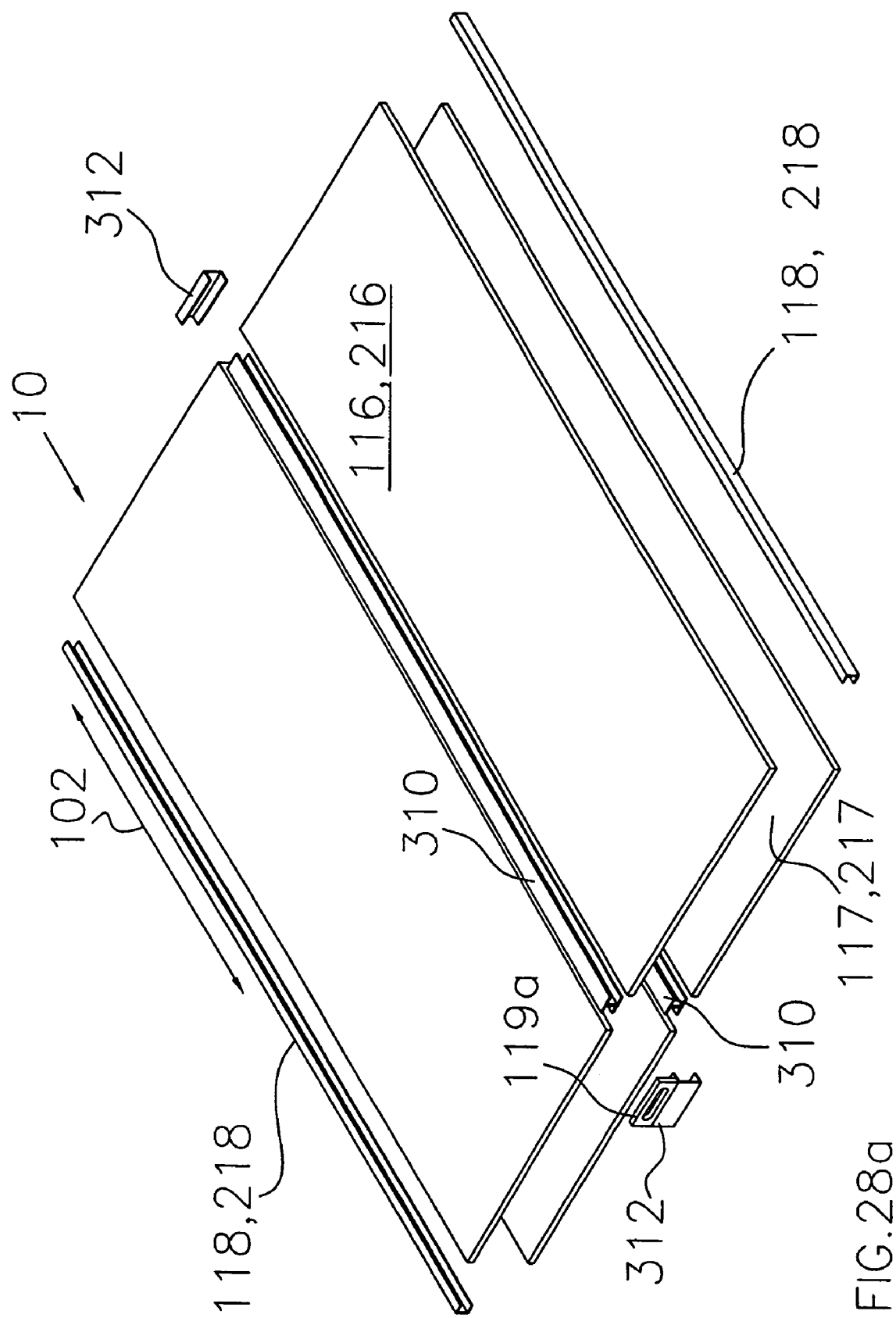

VEHICLE SLIDING FLOOR EXTENSION

RELATED APPLICATIONS

This application is a continuation-in-part of U.S. patent application Ser. No. 10/883,248 filed Jul. 2, 2004 now U.S. Pat. No. 6,976,720, which is a continuation-in-part of U.S. patent application Ser. No. 10/185,984 filed Jul. 1, 2002, now abandoned, which is a continuation-in-part of U.S. patent application Ser. No. 10/068,541 filed Feb. 8, 2002, now U.S. Pat. No. 6,503,036.

BACKGROUND OF THE INVENTION

1. Field of the Invention

This invention relates to truck beds and SUV rear compartments and attachable deck extensions therefore, and more particularly, to a composite/plastic sliding extension plate attached to a truck bed or bedliner or SUV rear compartment by a base plate having molded rails of metal, plastic, or composite to facilitate the controlled movement of the extension plate, the movement of the extension plate being manually or motor actuated.

2. Prior Art

The present invention relates to motor vehicles specifically relating to an improvement in the utility of the cargo area of such vehicles. With the proliferation of compact, mid-size, full-size pickup trucks with short beds and recent developments of hybrid vehicles capable of being converted into pickups to closed rear compartment configurations, limitation is placed on the ability of vehicle owners to effectively haul longer items typically accommodated by longer beds (e.g., a 4 foot×8 foot sheet of plywood.)

Owners of hybrid pickup/SUV vehicles, find difficulty in accessing the enclosed rear deck even with the tailgate down and with one or more top panels removed. Additionally, designers of these vehicles choose lining materials for the floor and walls of these compartments which have high coefficients of friction so that contents tend to remain stationary by reason of their "adhesion" to the surface. Added to the awkward access to such compartments, the difficulty in sliding something over this high friction surface dramatically decreases the utility of the vehicle. Simple activities such as grocery shopping are made difficult if not impossible by a person of small stature and even larger, stronger users have trouble reaching and moving items.

U.S. Pat. No. 6,312,034 to Coleman et al. discloses a "drop-in" bed liner/deck extension which addresses a number of the difficulties described and while extension is provided, the attachment methods described, do not allow for safe transport of heavier items for which the vehicle is designed (typically 1000.lbs for a half-ton pickup) nor does it describe any motor means for moving the extension when it may be so loaded and while a braking means is therein described, it does not provide for braking at any point of extension, relying as it does upon a series of holes into which a brake pin is inserted.

Concerning the proliferation of multiple purpose vehicles such as SUVs, vans and station wagons, the rear cargo area is subjected to a drivers range of uses by consumers such as hauling groceries, luggage, golf clubs, and other valuable and sometimes fragile items. A problem faces by owners of such vehicles is how to restrain smaller items or compartmentalize the space to keep items separate. An additional problem is the discomfort and potential for back injury associated with the necessity of leaning into the cargo area for loading and unloading of heavy cargo items.

The present invention addresses these problems and while it shares in common with U.S. Pat. No. 6,312,034 to Coleman et al., the use of interlocking rails between a base member and a sliding extension member, it differs in the attachment, motorization, braking, and construction of these components and presents a modular "L" bracket design allowing for the creation of storage/containment areas anywhere over the surface of the bed extension. Additionally, the present invention is, by reason of its fixture to the vehicle as a bolt-on (or other sufficient attachment means known in the art) insert to the rear deck, more substantial in its capacity to safely manage heavy loads.

In accordance with the present invention, a base mounting platform is affixed to the bed/deck of a motor vehicle (i.e., pickup truck, SUV or hybrid, etc.) and a slideable bed extension attached by interlocking rails molded or otherwise formed between the base and the bed extension, is provided along with a motorized means of moving the bed extension and a braking means for retaining it in a chosen position and a series of attachable partitions to form compartments by which items being transported may be contained or constrained.

Accordingly, several objects and advantages of the present invention are:

1. To provide a vehicle bed floor with an integrated sliding bed extension to increase the utility of shorter beds for hauling longer items;
2. To have the bed extension available to facilitate ease of loading and unloading of items stored within the vehicle cargo area.
3. To provide a two piece interlocking base/bed extension to be firmly affixed to the existing vehicle bed or deck which is simple in its operation as well as its manufacture.
4. To provide a durable deck surface on the bed extension which has a plurality of holes drilled or formed to accommodate the positioning of modular partitions for containing or restraining items being transported.
5. To provide motorization whereby the bed extension can be moved even while heavily laden.
6. To provide a braking means by which the bed extension can be locked in any position of deployment.
7. To provide support skids interposed between the base and the bed extension, which ride over the face of the lowered tail gate as the extension is moved across it.
8. To provide low friction bearing surfaces interposed between the base and the bed liner.

DESCRIPTION OF THE INVENTION

The invention is a base for attachment to the bed of a pickup truck, SUV etc., and an interlocking, slideable deck attached thereto. Both the base and the bed are made of plastic, composite or other durable material. The base is fixed to the vehicle in secure fashion and provides a support for the deck. Motor and braking apparatus are fixed between the base and the deck providing means for moving and controlling the extension of the bed beyond the limits of the existing vehicle bed and tailgate. Holes and other attachment/location means are provided along with multiple modular partitions for securing items against movement while they are being transported. The configuration of the attachment holes in a grid pattern allows for multiple arrangements of the partitions to secure and/or contain a large variety of transported items. The deck surface is textured to decrease friction against loads being carried so that, once the load is unbound or unrestrained, it can easily slide over the deck surface facilitating the management of bulky heavy articles in a manner consistent with the overall intention of the invention.

The deck is interlocked with the base by a plurality of grooves and rails in the shape of a "T" or other suitable shape. Between each rail set is a fixed slide attached to the bottom side of the deck. These slides act to support and guide the deck as it is slid out over the tailgate. The deck and thus the slides would ideally be manufactured from durable, slippery plastic material to provide maximum ease of use with minimum friction. A stop or bumper is fitted to one or more of the base rails to stop the deck from sliding out too far and possibly separating dangerously from the base. In a first embodiment, the deck is moved back and forth being driven by a motor means attached to an endless chain and attachment pad. In a further embodiment, the endless chain would be replaced by an endless wire rope with a pad attached and in a further embodiment a worm drive moves the deck. In the latter embodiment, no braking mechanism is required as the worm drive acts as a brake whenever it ceases to move. Braking in other embodiments can be accomplished using a pawl and ratchet track wherein the pawl is engaged and disengaged from the track by activation through a grip handle release common to prior art ratchet installations.

In still another variation of the invention, instead of a base panel, a bedliner is used as the base. In this embodiment, the extendable vehicle cargo floor assembly comprises a bedliner on a vehicle cargo floor; a panel of semi-rigid material forming a cargo deck, said deck having a top surface and a bottom surface, a first edge and a second edge, a front end and a back end, said bottom surface of said deck having a plurality of low friction strips affixed to said bottom surface of said panel, said panel being in a slideable overlying relationship to said bedliner; a pair of spaced-apart guide means affixed to the bedliner for guiding the extending operation of the panel; and means for facilitating the extending of the panel through a tailgate access opening of the vehicle. The pair of spaced-apart guide means comprise channels within which the first and second edges of the panel slide.

In order to save significant charges related to shipment by ground of the inventive parts of the invention, an alternative to the single slideable panel is to make the panel as two or more portions joined together. These can be joined at installation with an H-channel or hinge device or other joining means known in the art.

In still another variation of the previously described invention with a base pane and slideable panel, each panel is made as two or more portions joined together. These can be joined at installation with an H-channel or hinge device or other joining means known in the art.

BRIEF DESCRIPTION OF THE DRAWINGS

FIG. 4 is a top view partially in section of the invention, showing the relative positions of the tail gate of a vehicle and the bed extension unit as the unit is deployed to its maximum extension;

FIG. 15 is an enlarged rear elevational view partially in section, of a typical SUV/pickup/hybrid vehicle showing the alternative embodiment of the invention installed in the bed compartment of the vehicle;

FIG. 16 is an end elevation of the alternative embodiment of the invention installed in the bed compartment of the vehicle;

FIG. 16a is an enlargement of a section of the invention showing the grooved underside;

FIG. 17 is an end elevation of the alternative embodiment of the invention installed in the bed compartment of the vehicle;

FIG. 17a is an enlargement of a section of the invention showing the grooved topside;

FIG. 18 is an end elevation of a further alternative embodiment of the invention;

FIG. 19 is an end elevation of the alternative embodiment of the invention installed in the bed compartment of the vehicle;

FIG. 20 is an enlargement of a section of FIG. 18 showing the location of low friction support strips;

FIG. 21 is a bottom view of the alternative embodiment of the invention showing the location of low friction support strips;

FIG. 25b depicts one example of including a channel with the bedliner of FIG. 25a;

FIG. 25c depicts another example of including a channel with the bedliner of FIG. 25a;

FIG. 26 depicts an example of a method of compacting slideable panels for shipment by joining portions of the panels with an H-channel;

FIG. 27 depicts an example of a method of compacting the underlying panels for shipment by joining portions of the panels with an H-channel;

FIG. 28a is an exploded isometric view of another embodiment of the invention wherein the respective panels are segmented as depicted in FIGS. 26 and 27; and FIG. 28b is a cross-sectional view along the H-channel of FIG. 28a.

DETAILED DESCRIPTION OF THE INVENTION

Figure 1:
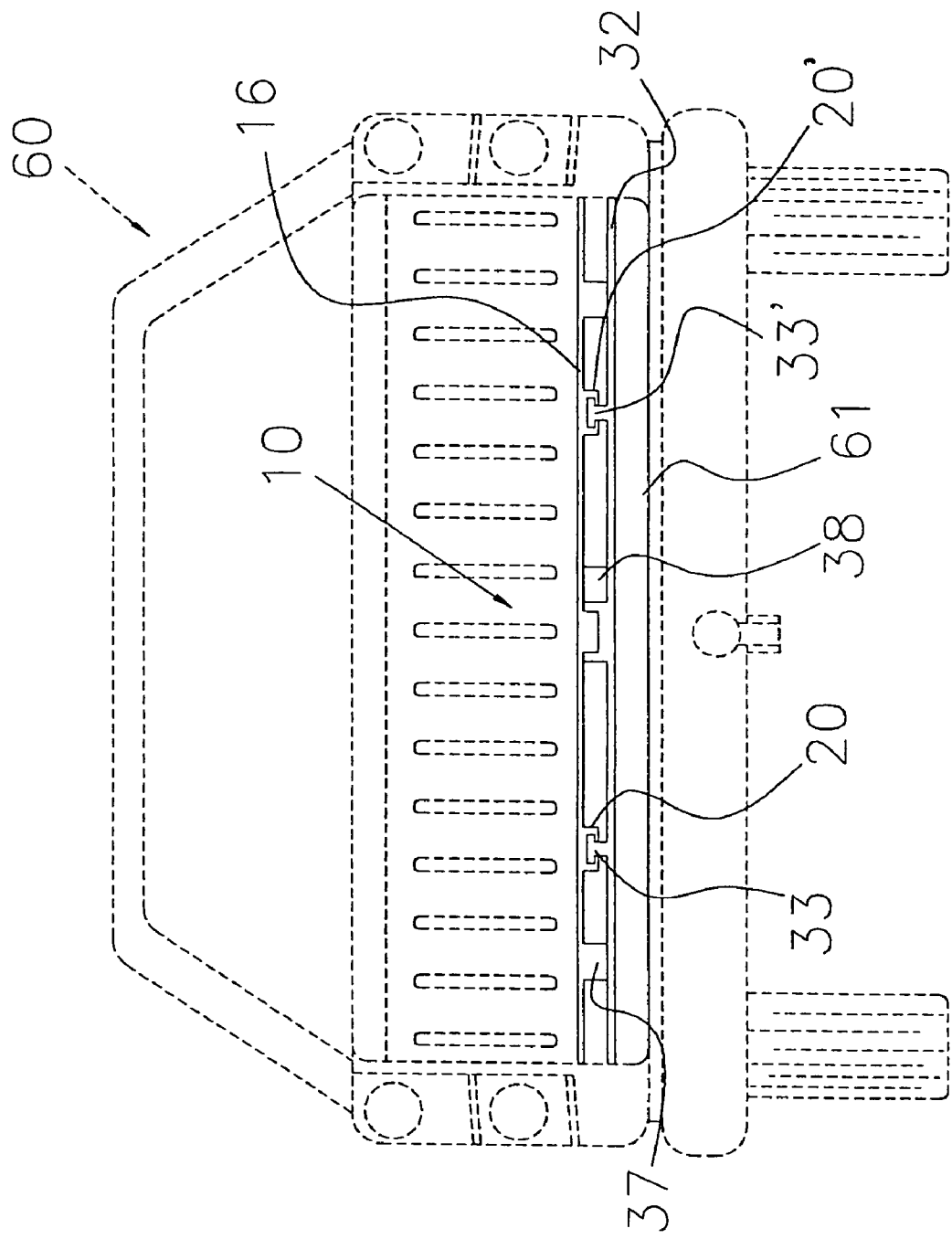
FIG. 1 is a rear elevational view partially in section, of a typical SUV/pickup/hybrid vehicle showing the invention installed in the bed compartment of the vehicle, where this end view shows the relative positions of the base unit and the deck extension unit.

Referring now to the drawing wherein like numerals designate like and corresponding parts throughout the several views, the invention is designated overall by the numeral 10. In FIG. 1 bed extension unit 10 is fitted to the bed of vehicle 60. Tailgate 61 is in the down/open position. Deck 16 generally overlies base 32 riding upon T-rails 33 and 33' in channels 20, 20'. Skids 37 add support to deck 16. Safety stop 38 prevents deck 16 from being over extended (see also FIGS. 3 and 4).

Figure 2:
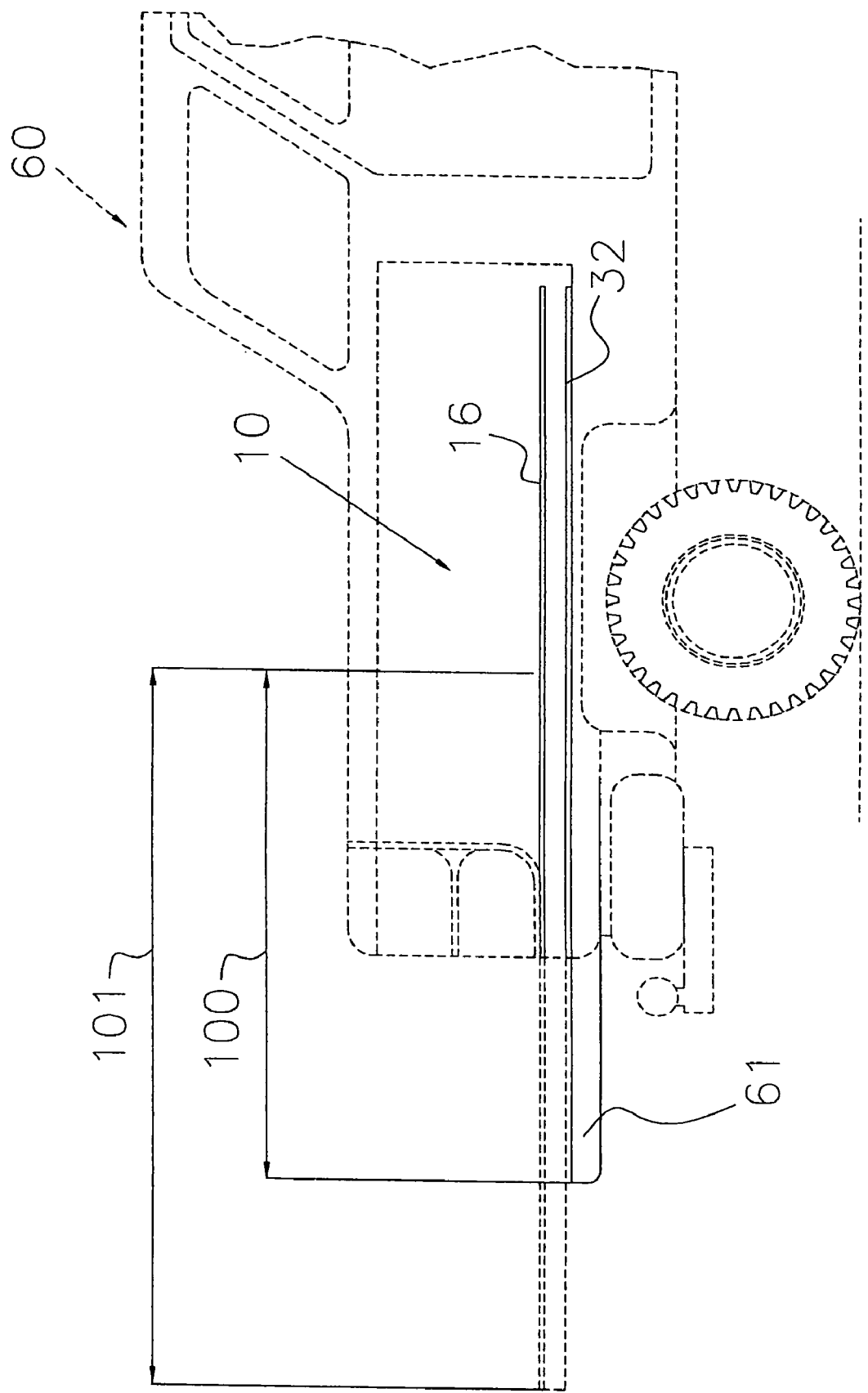
FIG. 2 is a side elevational view partially in section, of a typical SUV/pickup/hybrid vehicle showing the invention installed in the bed compartment of the vehicle, where this view shows the relative positions of the base unit and the deck extension unit.

Referring now to FIG. 2 in which tailgate 61 is in the open position and bed extension unit 10 is fitted to the bed of vehicle 60. Arrow 100 denotes the limits of reach before the deployment of deck 16 and arrow 101 denotes the now extended scope of reach.

Figure 3:
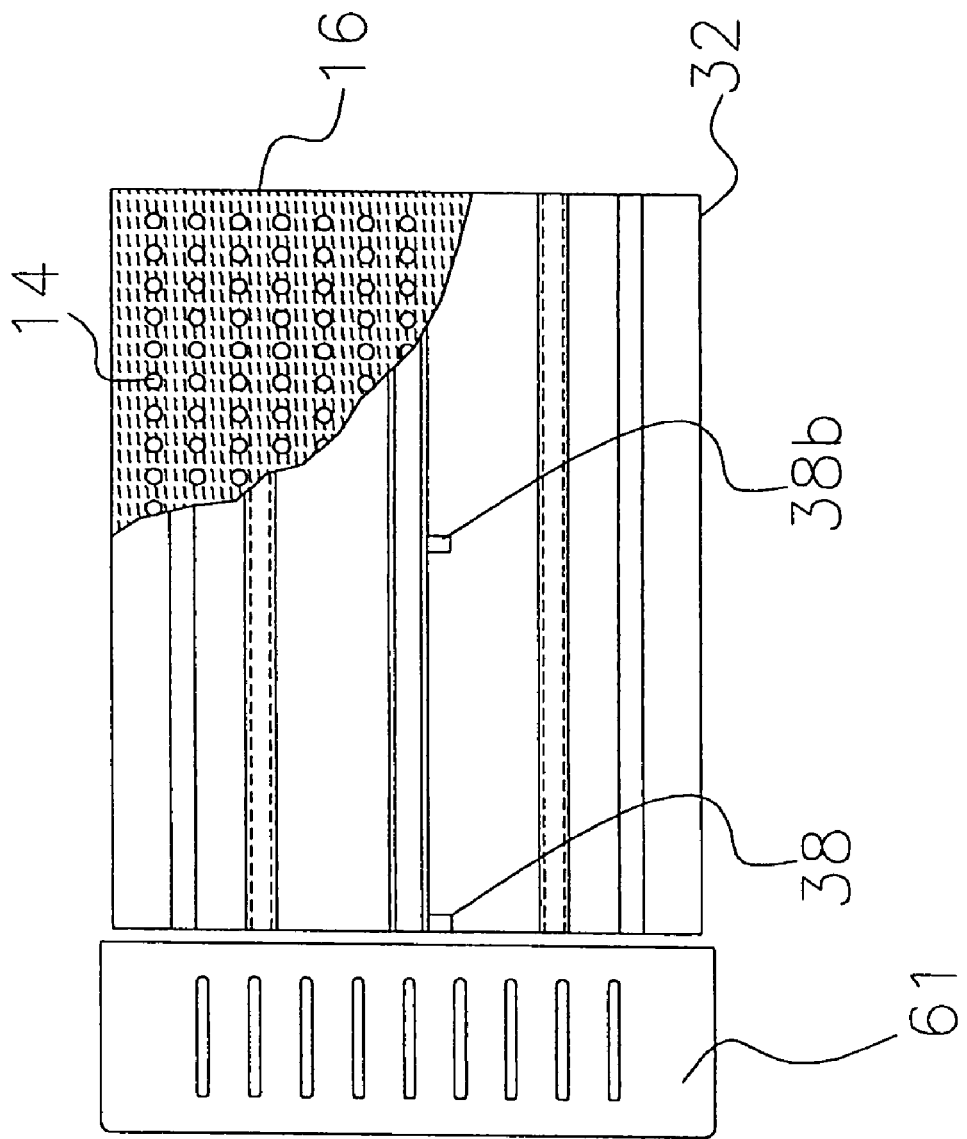
FIG. 3 is a top view partially in section of the invention, showing the relative positions of the tail gate of a vehicle and the bed extension unit.

In FIG. 3, deck 16 is in its retracted position and peg holes 14 are visible. Bumper stop 38 is positioned to catch stop 38b which attaches to deck 16.

In FIG. 4, arrows 104 denote the extendable length of truck bed 62 beyond tailgate 61. Stop 30b prevents any further extension.

Figure 6:
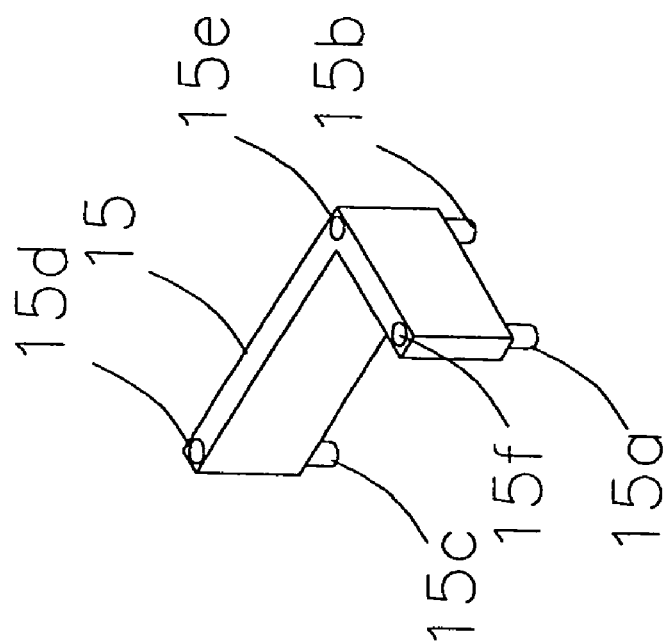
FIG. 6 is and isometric view of a modular partition unit.
Figure 5:
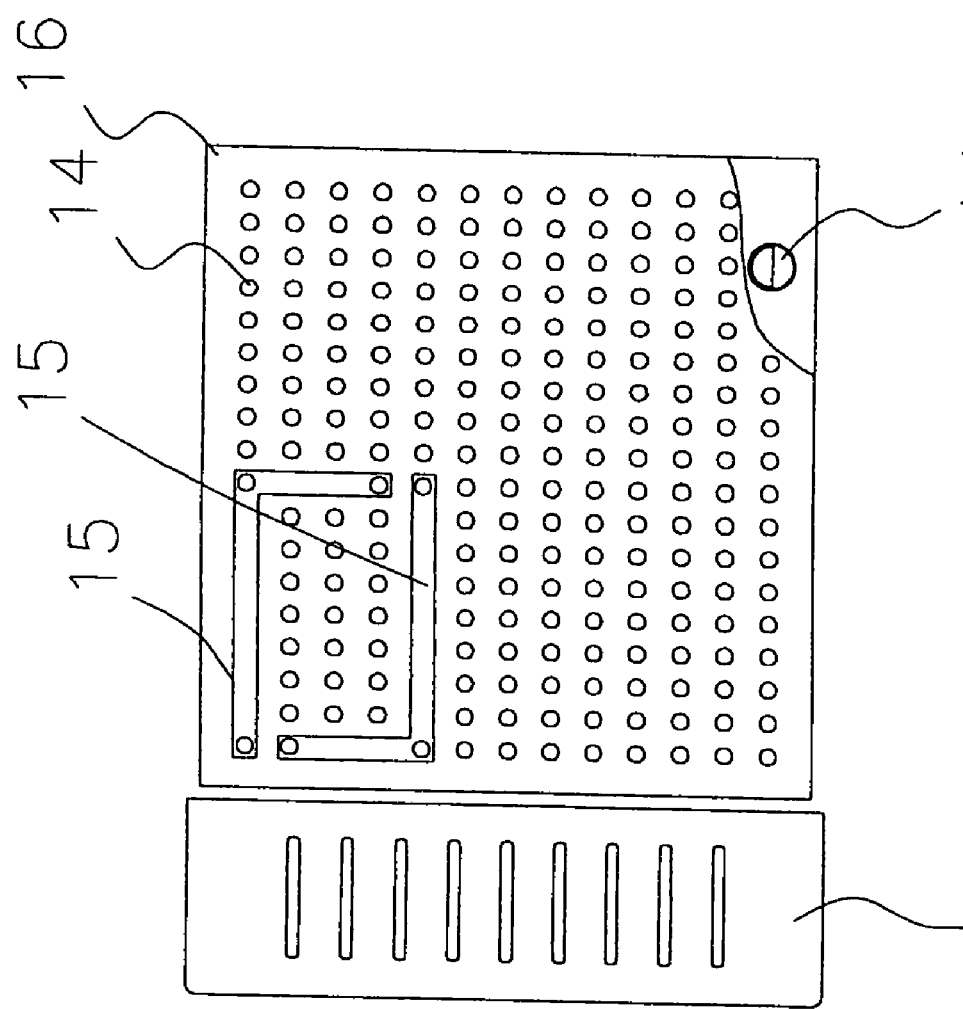
FIG. 5 is a top view of the invention showing partition sections in place and showing an example of an alternative securing point for object in the truck bed.
Figure 7:
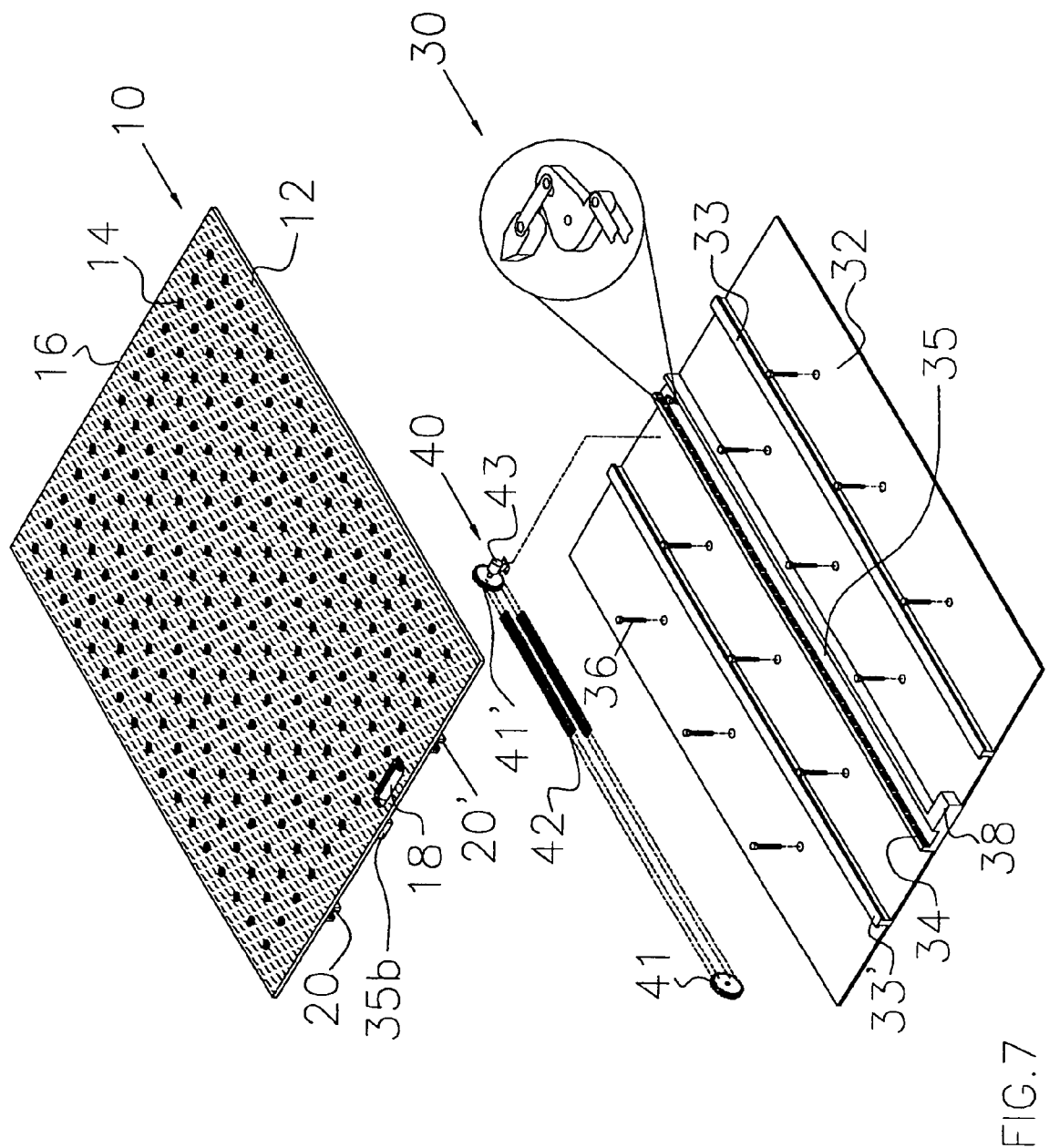
FIG. 7 is an exploded isometric view of the invention showing the general arrangement and relative positions of the components of the invention.

Referring now to FIGS. 5 and 6, peg holes 14 permit the insertion of pegs 15a,b,c to locate and fix partitions 15 on deck 16. Holes 15d,e,f allow for further partition units to be joined to partitions 15. D-ring 14a is an example of alternative attachment points used to fix objects to bed 16. In FIG. 7, bolts 36 fix base 32 to the vehicle. "T" tracks 33 and 33' slot into slots 20 and 20'. Rib 35b slideably fits into slot 35. Notched track 34 engages ratchet unit 30 to act as a brake for deck 16. Raised pattern 12 decrease frictional surface area of deck 16. Ratchet release handle 18 doubles as a handle to manually operate deck 16 if necessary. Chain drive unit 40 has sprockets 41 and 41' which are driven by motor 43.

Figure 8:
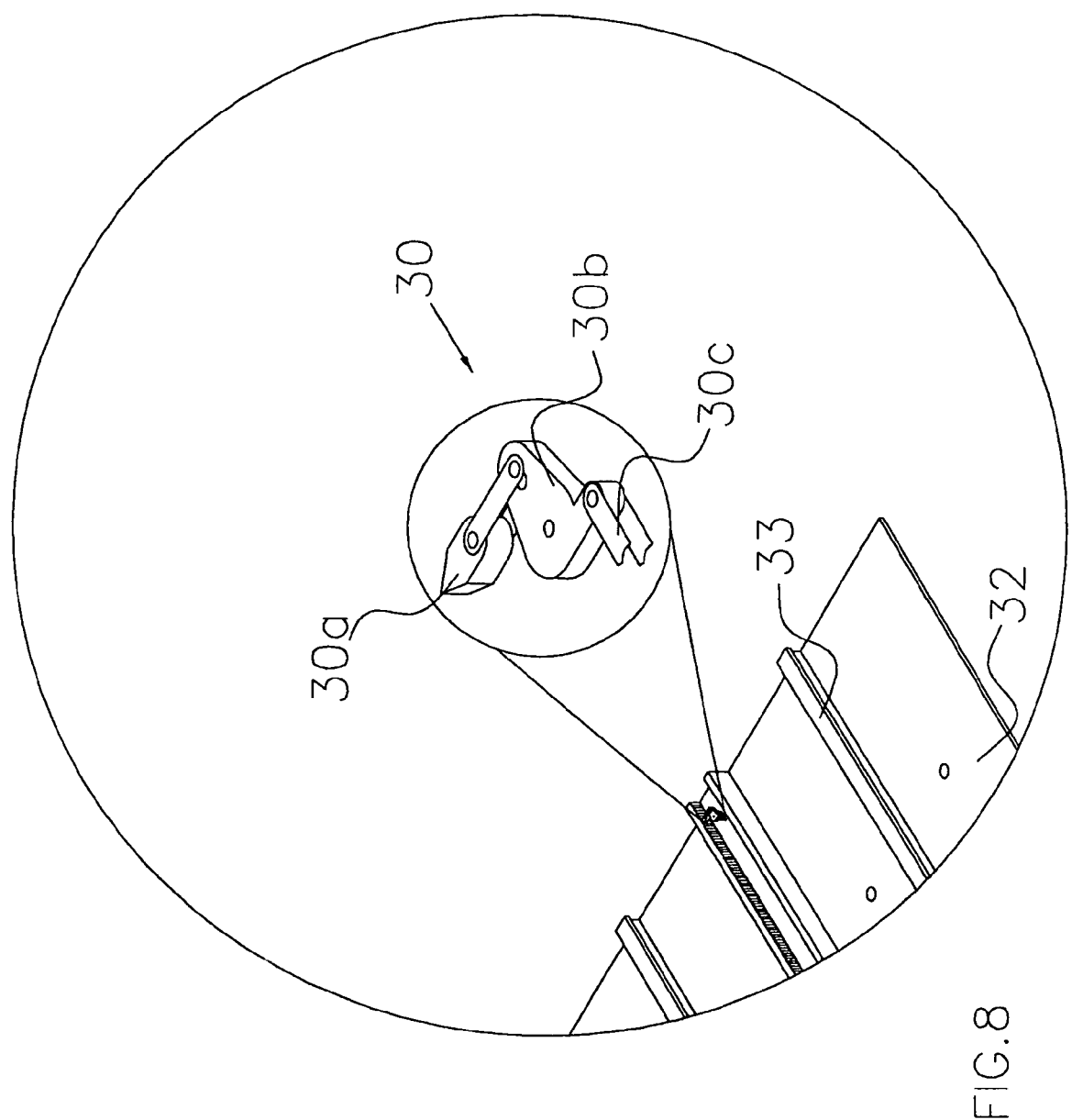
FIG. 8 is an isometric enlargement of a ratchet/pawl locking component.
Figure 9:
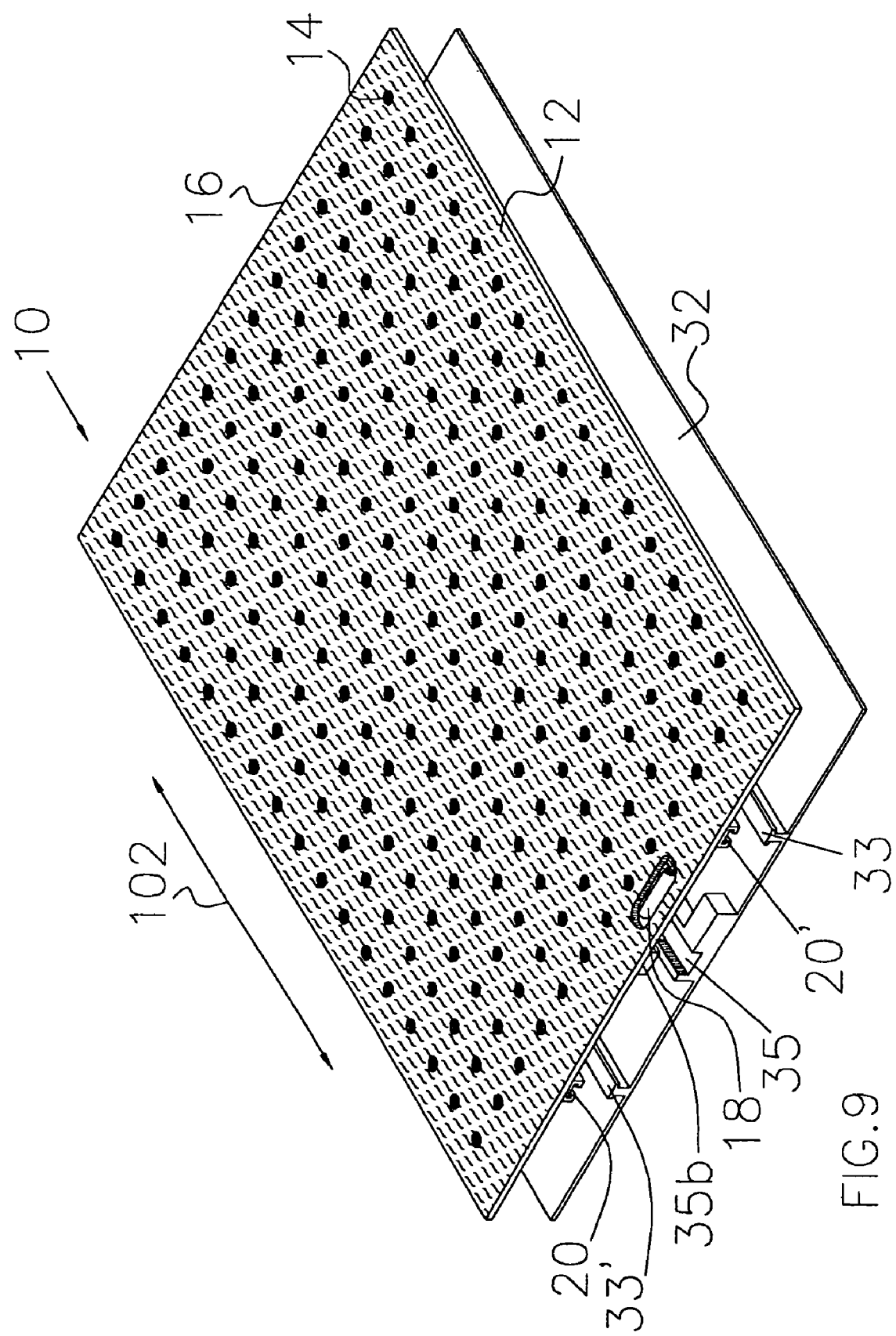
FIG. 9 is an isometric view of the invention showing the direction of deployment of the deck unit.
Figure 10:
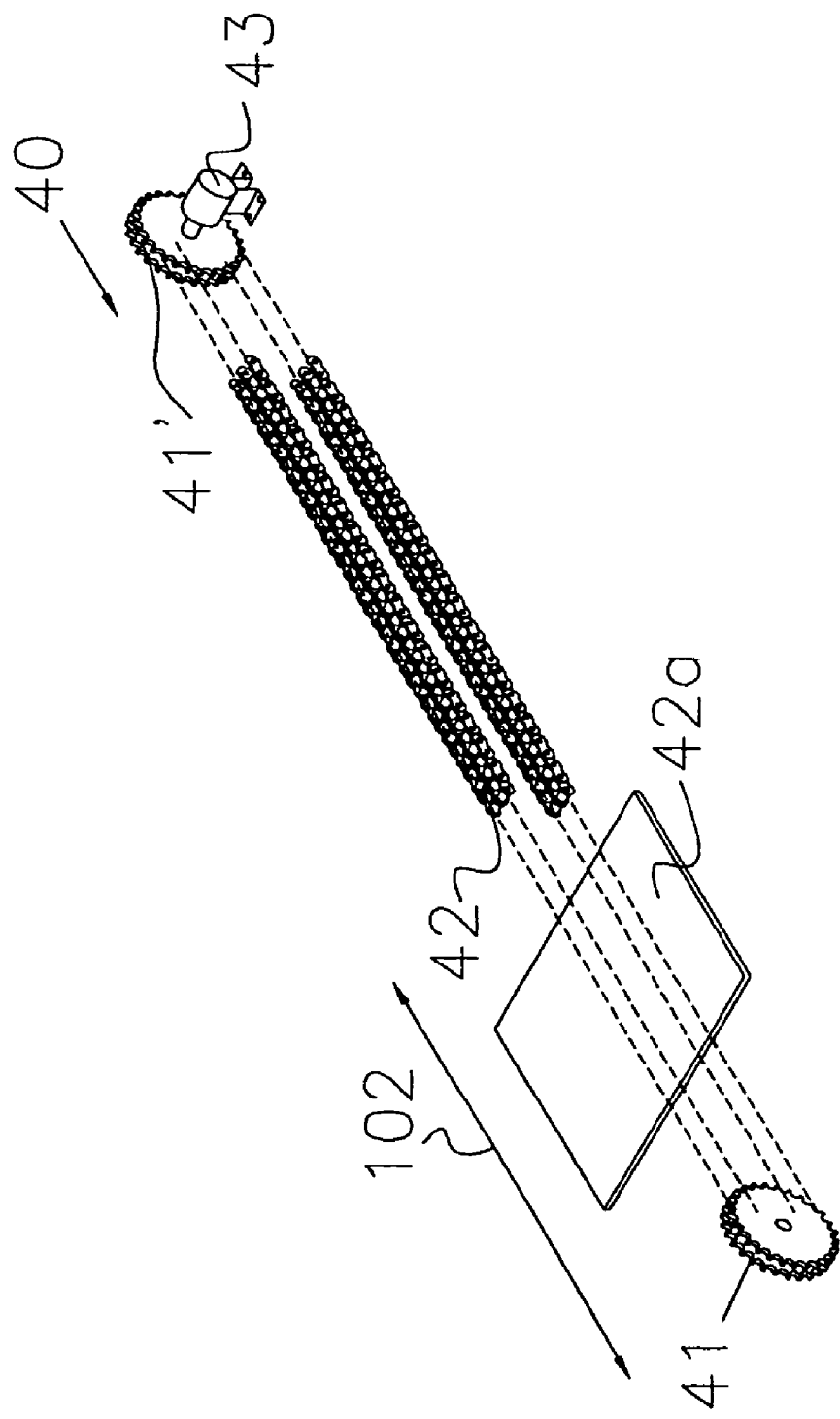
FIG. 10 is an isometric view enlargement of a chain drive unit for moving the deck unit.
Figure 11:
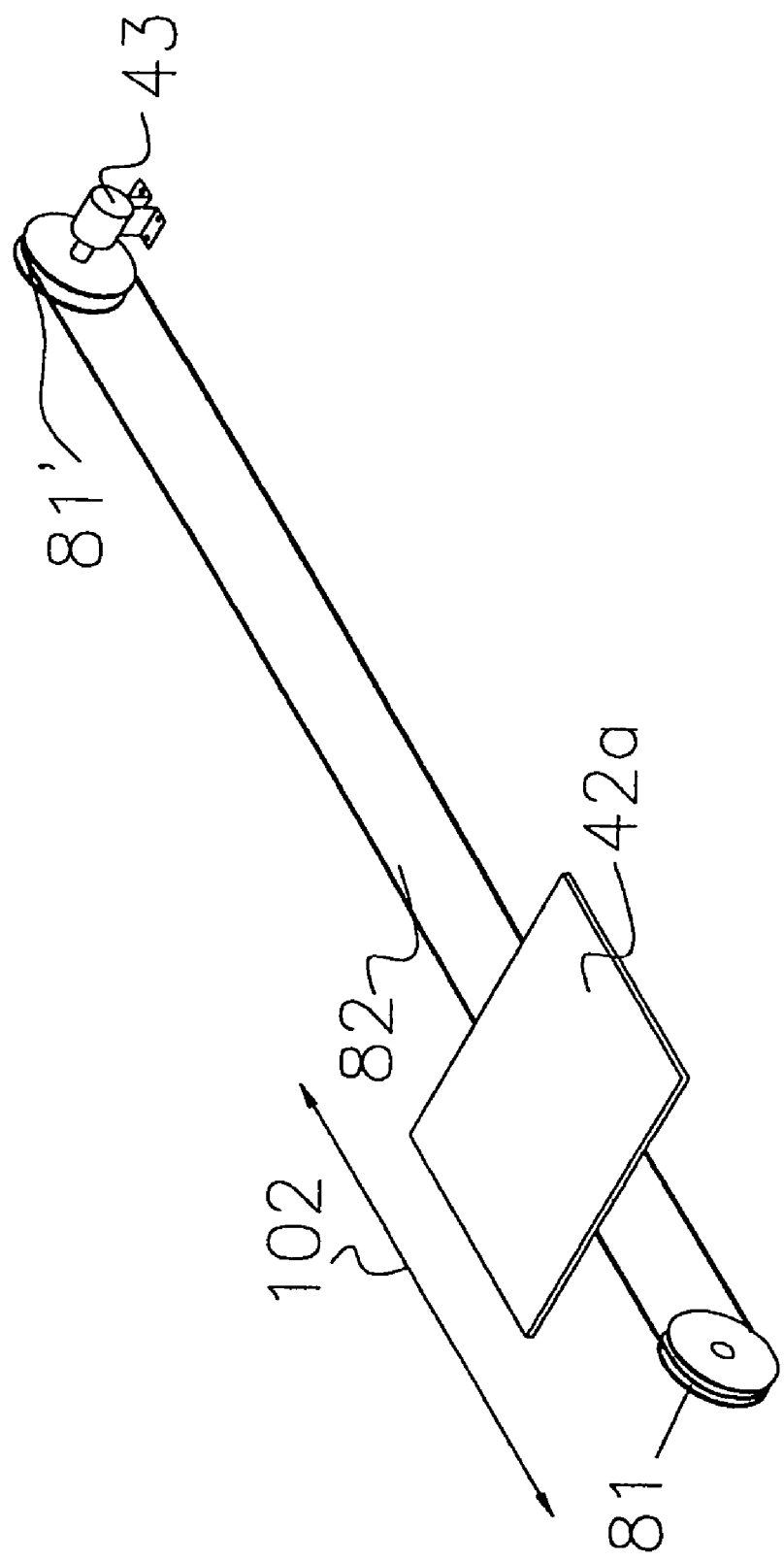
FIG. 11 is and isometric view of a cable drive unit for moving the bed.
Figure 12:
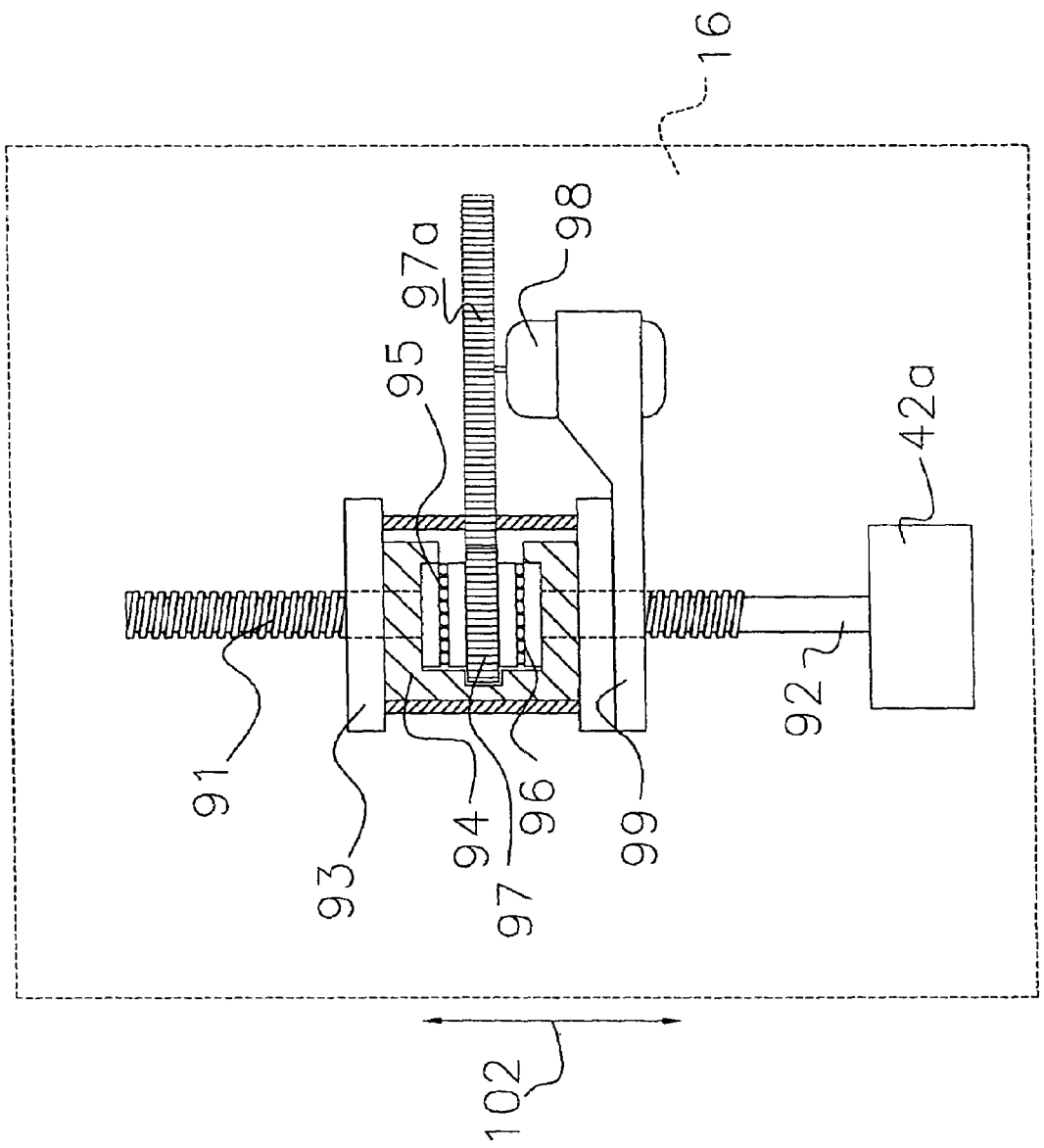
FIG. 12 is a top view (not to scale) of a worm drive unit for moving the bed.

In FIG. 8, ratchet unit 30 comprises control arm 30c which turns cam block 30b to disengage pawl 30a from track 34 (FIG. 7). In FIG. 9, arrows 102 denote the directions in which deck 16 can move. In FIG. 10, attachment point 42a is moved in the direction of arrows 102 to move bed 16. Motor 43 drives cog 41', chain 42 and cog 41. In FIG. 11 motor 43 drives pulleys 81 and 81' and cable 82 which is attached to attachment point 42a and moves in the direction of arrows 102. FIG. 12 presents a worm-drive method for moving deck 16 which is fixed to attachment point 42a. As reversible motor 98 turns gears 97 and 97a, thrust bearing 95 and 96 position screw shaft 91/92 within bracket 94 in housing 93 and motor mount 99 holds motor 98 in position. Attachment point 42a is fixed to deck 16 which travels in the direction of arrows 102 in response to the linear movement of screw shaft 91/92.

Figure 13:
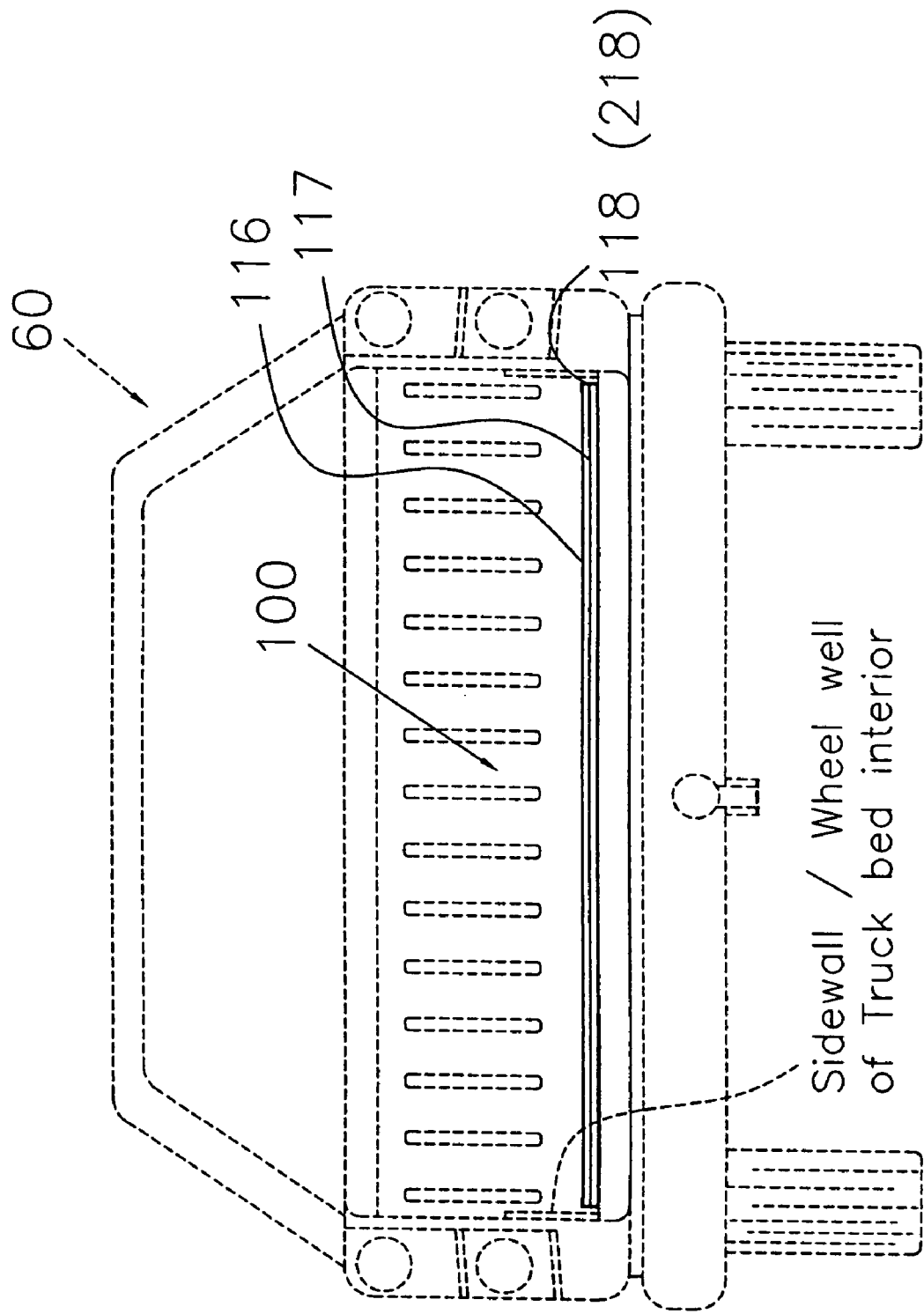
FIG. 13 is a rear elevational view partially in section, of a typical SUV/pickup/hybrid vehicle showing an alternative embodiment of the invention installed in the bed compartment of the vehicle.
Figure 14:
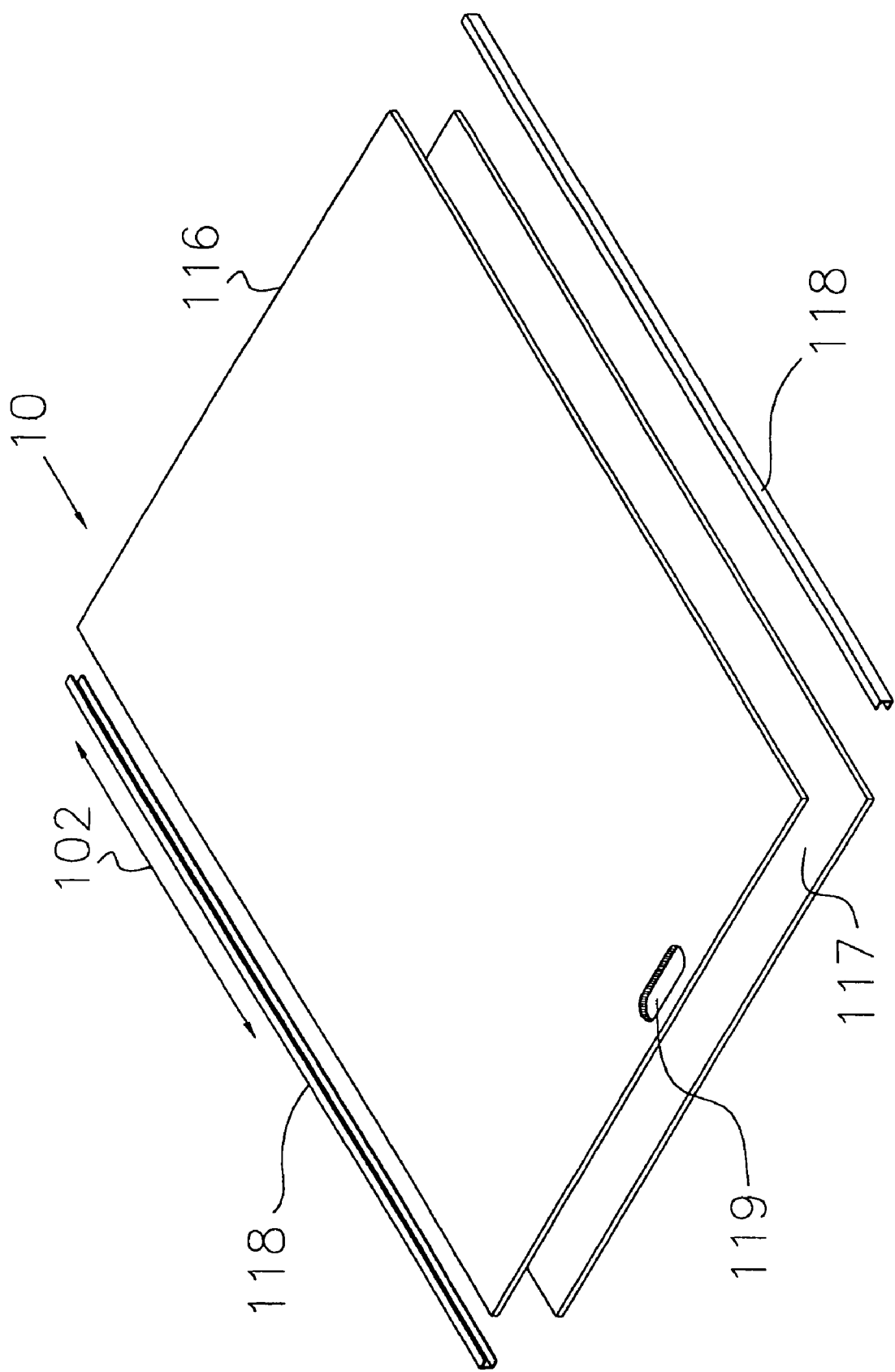
FIG. 14 is an exploded isometric view of the invention showing the direction of deployment of the deck unit and the channel forms in which the deck unit is encased in the alternative embodiment.
Figure 22:
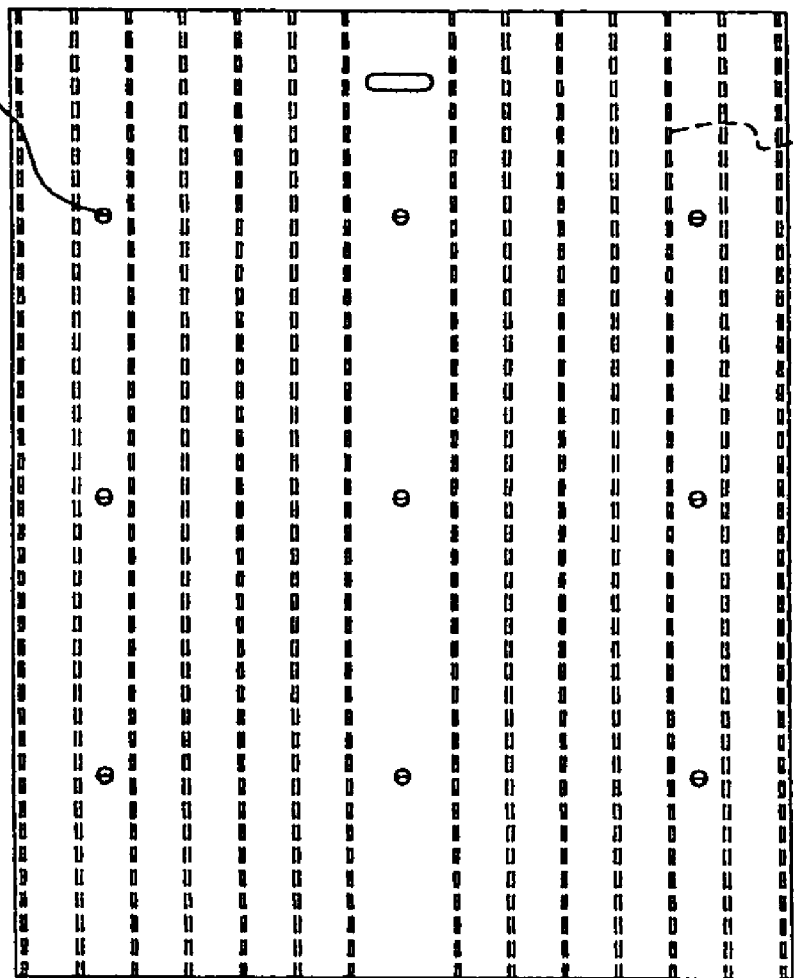
FIG. 22 is a plan view, partially in section, of the alternative embodiment of the invention showing the location of low friction support strips.
Figure 23:
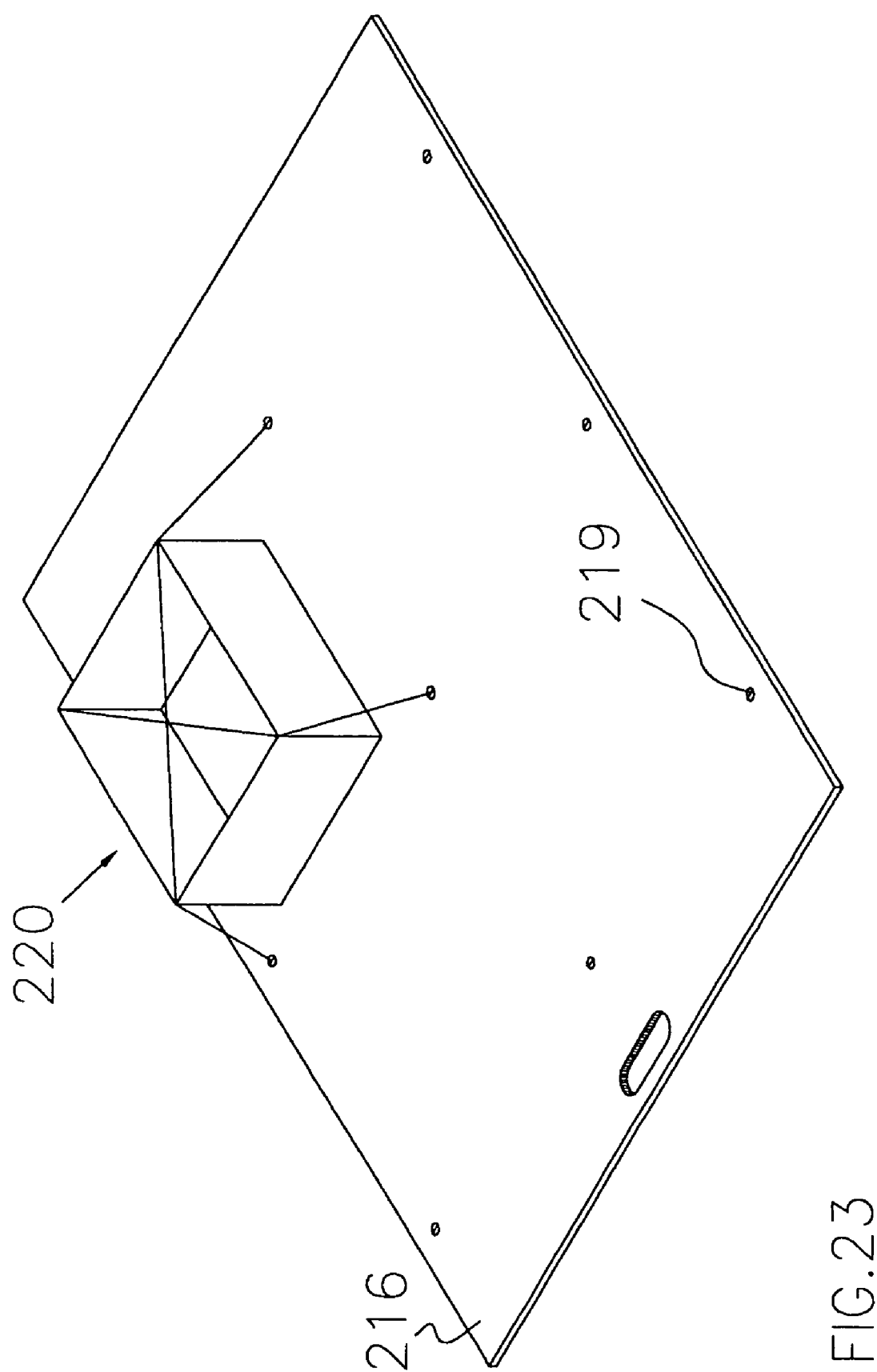
FIG. 23 is an isometric view of the alternative embodiment showing a box temporarily attached to the sliding deck.

An alternative embodiment is disclosed in FIG. 13 to which reference is now made. The invention overall is designated by the numeral 100. Truck 60 is fitted with "U" channels 118 into which slide able panel 116 and fixed panel 117 are fitted. Slideable panel 116 generally overlays fixed panel 117. In FIG. 14, handle 119 is cut out of panel 116. "U" channels 118 are parallel to the axes of slide able panel 116 and fixed panel 117 allowing panel 116 to slide over panel 117 in the direction of arrow 102. FIG. 15 is an enlargement of FIG. 13 showing the relative positions of panels 116 and 117 and "D" channel 118. As viewed in the drawings, channels 118 are spaced-apart and located on the bed floor of the vehicle storage bed in such a way so that slidable panel 116 is capable of being extended over the tailgate portion of the truck bed. This means that channels 118 must not only be between the wheel wells or sidewalls of the interior of the truck bed, the channels must be positioned so that the slidable panel clears the side edges of the wrap around tail light portion of the truck bed and the cable connected to each of the tailgate sides. This then allows the sliding panel to extend through the tailgate access opening created when the tailgate is lowered or lifted in the case of certain sport utility vehicles. This is obvious from the drawings; otherwise the slidable panel would not be capable of being extended. Panels 116 and 117 may have grooved surfaces as shown in FIGS. 16a and 17a to which reference is now made. FIG. 16a is an enlarged end view of panel 116 looking in the direction of arrows A-A. The grooved texture 116a is on the lower side of the panel. FIG. 17a is an enlarged end view of panel 117, grooved texture 117a is on the top side. In operation, grooved textured surfaces 116a and 117a are aligned perpendicular to each other such that their common frictional surfaces are reduced to facilitate the sliding of panels 116 and 117.

Figure 24:
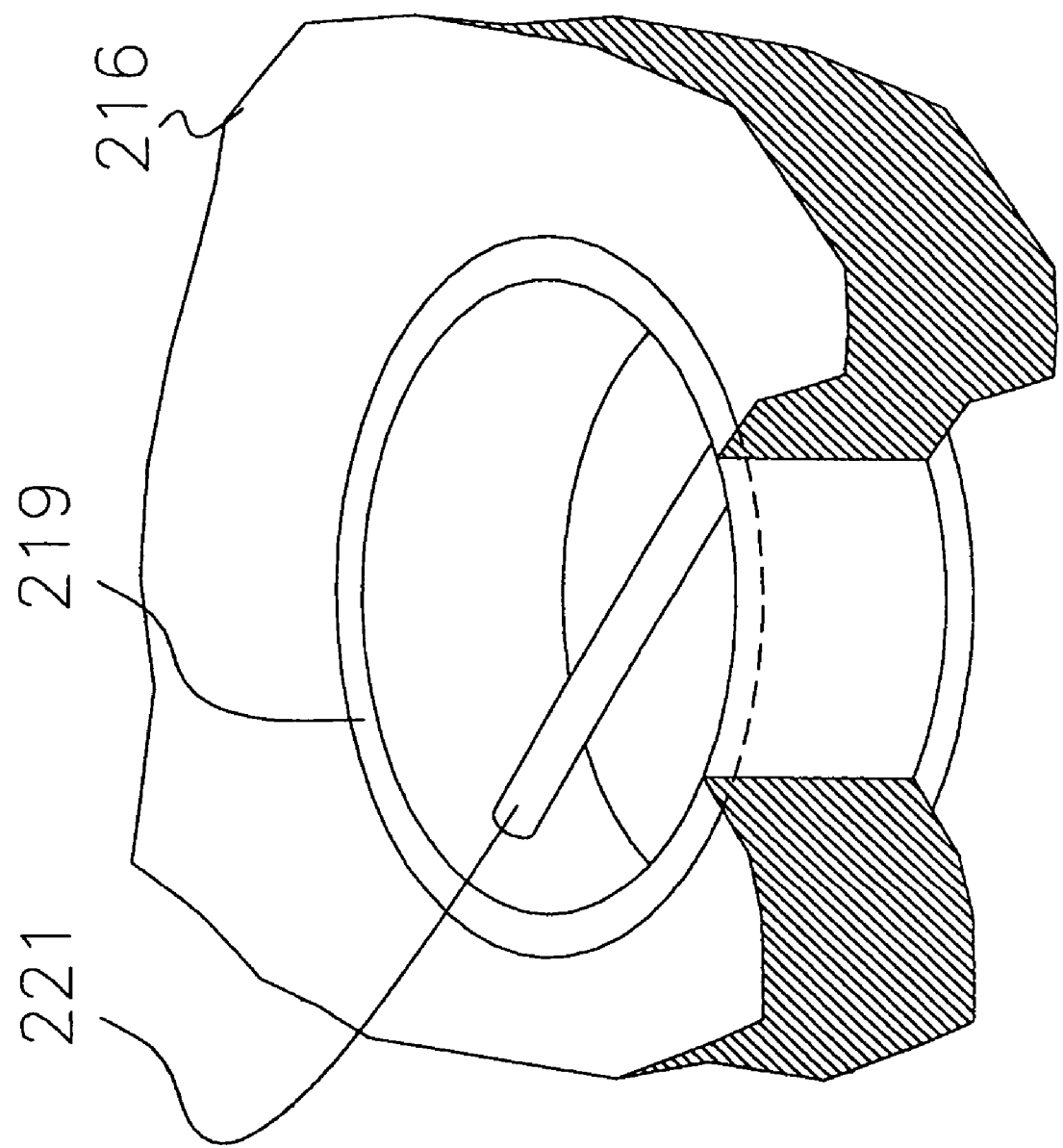
FIG. 24 is an isometric enlarged sectional view of a tie-down anchor point of the alternative embodiment.

An alternative embodiment is disclosed in FIGS. 18-24 to which reference is now made. In FIG. 18, sliding bed extension 216 is mounted with low friction strips 216a on the lower face. Base 217 is affixed to the truck bed and channels 218 provide guides and lateral support for extension 216 to slide over base 217. FIG. 20 enlargement shows the location of low fiction strips more clearly. In this embodiment, channels 218 correspond to channels 118 in FIGS. 13 and 15 when obtain a perspective of the location relationship of the channels 218 relative to the truck bed tailgate portion. That is, channels 218 are spaced-apart and located on the bed floor of the vehicle storage bed in such a way so that slidable panel 216 is capable of being extended over the tailgate portion of the truck bed. This means that channels 218 must not only be between the wheel wells or sidewalls of the interior of the truck bed, the channels must be positioned so that the slidable panel clears the side edges of the wrap around tail light portion of the truck bed and the cable connected to each of the tailgate sides. This then allows the sliding panel to extend through the tailgate access opening created when the tailgate is lowered or lifted in the case of certain sport utility vehicles. This is obvious from the drawings; otherwise the slidable panel would not be capable of being extended. Reference is now made to FIG. 21 showing the underside view of bed extension and FIG. 22 which shows the topside of bed extension 216 and the attachment of strips 216a. Anchor locations 219 are arranged so as to provide convenient tie-down points for cargo. This function is further illustrated in FIG. 23 where cargo assembly 220 is attached to bed 216. FIG. 24 shows detail of anchor 219 located flush to the surface of extension 216 in a through hole. Cross member 221 become a recessed point to which hooks and ties may be attached.

Figure 25A:
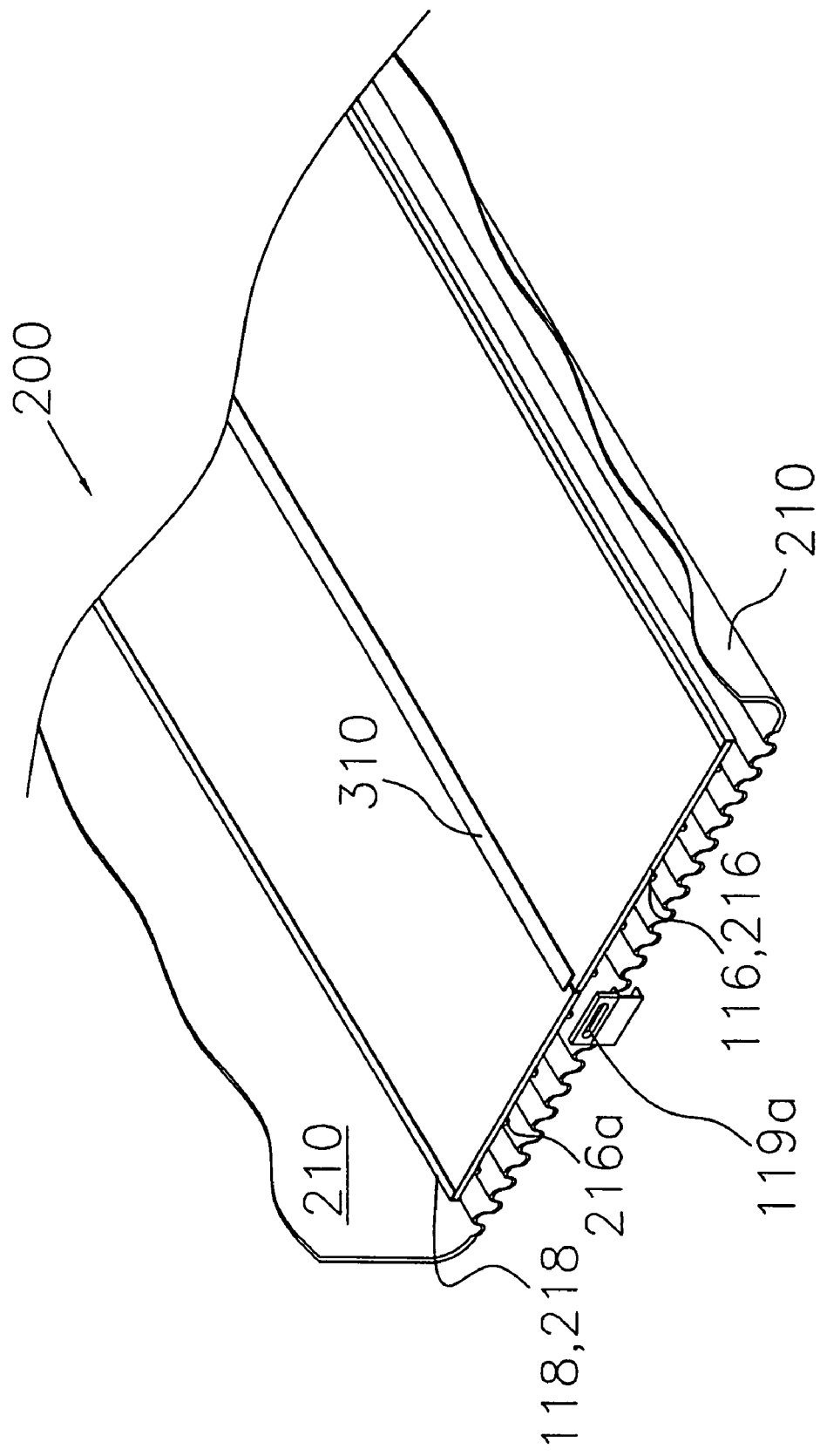
FIG. 25a is a rear elevational view partially in section, of a typical SUV/pickup/hybrid vehicle showing an alternative embodiment of the invention similar to the embodiment of FIGS. 13 and 15 except that the lower panel is substituted by a bedliner.
Figure 25B:
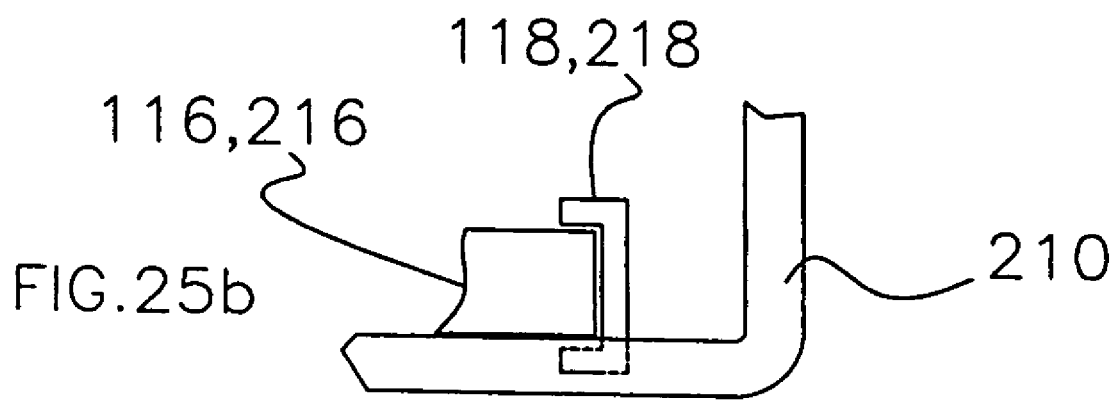
Figure 25C:
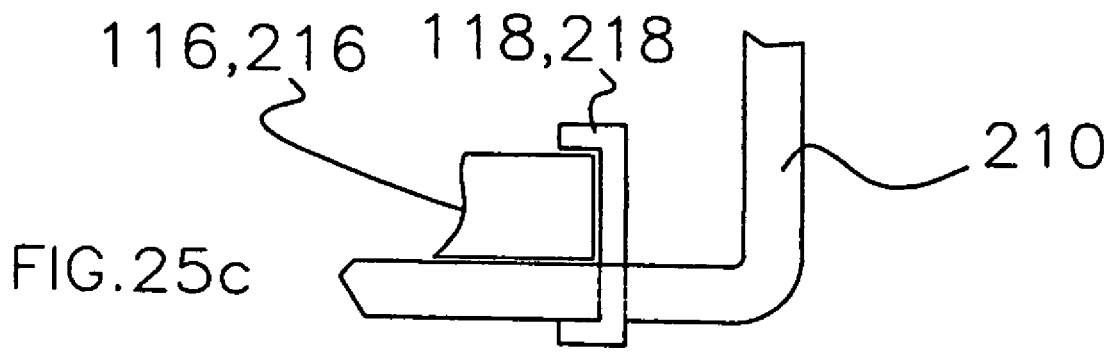
Figure 28B:
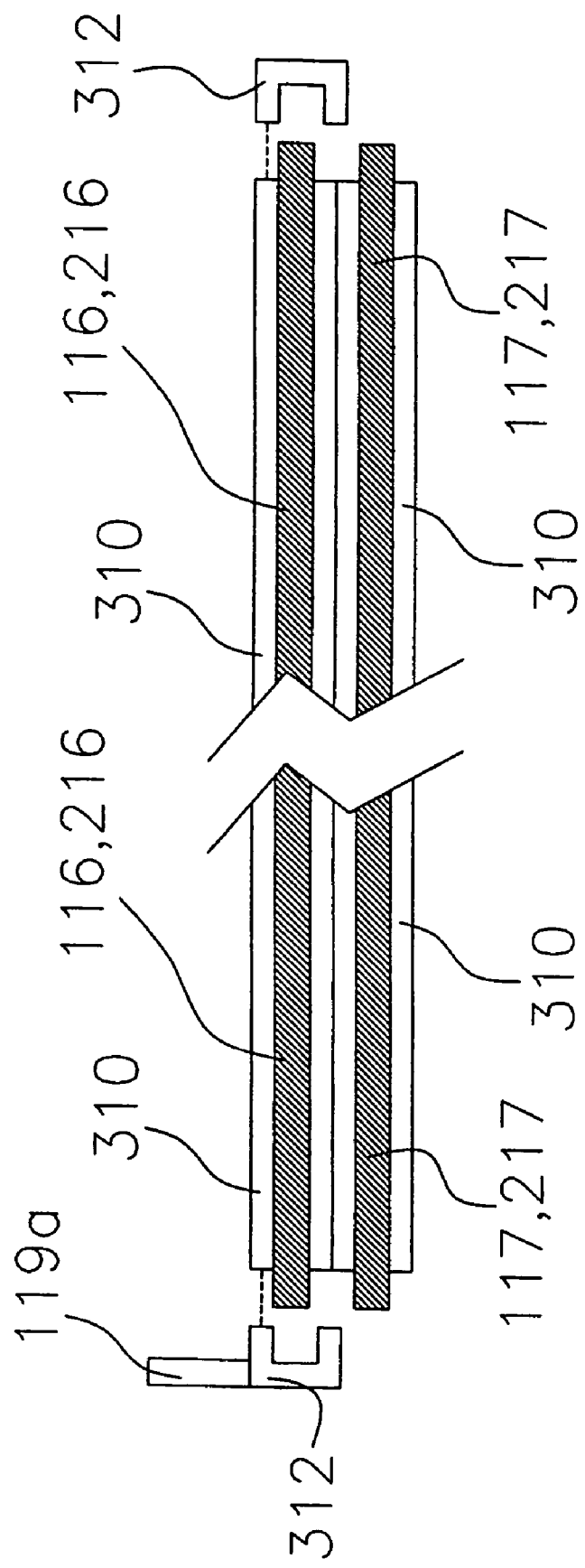

FIG. 25a is a rear elevational view partially in section, of a typical SUV/pickup/hybrid vehicle showing an alternative embodiment of the invention similar to the embodiment of FIGS. 13 and 15 except that the lower panel is substituted by a bedliner. As shown in the drawing, instead of a base panel, a bedliner 210 is used as the base. In this embodiment, the extendable vehicle cargo floor assembly comprises a bedliner 210 on a vehicle cargo floor; a panel 116,216 of semi-rigid material forming a cargo deck, said deck having a top surface and a bottom surface, a first edge and a second edge, a front end and a back end, said bottom surface of said deck having a plurality of low friction strips 216*a* affixed to said bottom surface of said panel 116,216, said panel 116,216 being in a slideable overlying relationship to said bedliner 210; a pair of spaced-apart guide means 118,218 affixed to the bedliner 210 for guiding the extending operation of the panel 116,216; and means for facilitating the extending of the panel through a tailgate access opening of the vehicle. The pair of spaced-apart guide means comprise channels 118,218 within which the first and second edges of the panel 116,216 slide. These channels 118,218 can incorporated in a several ways known in the art. FIGS. 25*b* and 25*c* merely depict examples. For example the channel may be molded or integrated with the bedliner or recessed within the bedliner as in FIG. 25*b* or inserted as depicted in FIG. 25*c*.

In order to save significant charges related to shipment by ground of the inventive parts of the invention, an alternative to the single slideable panel 116,216 or base panel 117,217 is to make the panel as two or more portions joined together as depicted in FIGS. 25*a*, 26, 27, 28*a* and 28*b*. These can be joined at installation by several methods known in the art, including with an H-channel 310 (example only depicted) or hinge device or other joining means known in the art.

There are many optional methods of providing means for facilitating the operation of the slideable panel 116,216 in and out of the vehicle cargo bed. For example, a hole 119 could be provided or a hand grasping handle 119*a* could be provided. In the example depicted of handle 119*a*, it is incorporated with one of the two end caps 312 when multiple segments of panels are used. The end caps 312 completes the joining the panels 116,216.

It should be noted that the embodiments of the vehicle sliding floor extension presented herein in detail for exemplary purposes is subject to variations in structure, design, application and methodology. Due to the fact that a variation of embodiments may be derived within the scope of the inventive concepts herein taught, and numerous modifications may be made to the exemplary embodiment herein presented in accordance with the descriptive requirements of the law, it should be understood that the details herein included in the detailed description of the present invention are to be interpreted as illustrative in nature and not in a limiting sense. Thus the scope of the invention should be determined by the appended claims and their legal equivalents, rather than by the examples given.

What is claimed is:

1. An extendable vehicle cargo floor assembly comprising:
    a first panel of semi-rigid material forming a base, said base being fixed to the vehicle cargo floor, said base having a top surface and a bottom surface, a first edge and a second edge, a front end and a back end,
    a pair of spaced-apart channel means affixed to said vehicle cargo floor, each of said channel means being parallel and opposite to each other, said first edge and said second edge of said base being fixedly mounted between said channel means,
    a second panel of semi-rigid material forming a cargo deck, said deck having a top surface and a bottom surface, a first edge and a second edge, a front end and a back end, said first edge and said second edge of said second panel being slideably mounted between said channel means, and slideably mounted in an overlying relationship to said base,
    said first and second panels each comprising two or more portions joined together; and
    means formed near said back end of said second panel for facilitating the extending of the second panel through a tailgate access opening of a vehicle,
    wherein the pair of said spaced-apart channel means are positioned so as to allow the second panel to be extended through the tailgate access opening of the vehicle.

2. The assembly according to claim 1, wherein said second panel is formed having a plurality of flush mounted anchor tie-downs conveniently located therein.

3. The assembly according to claim 1, wherein the means for facilitating the extending of the panel through the tailgate access opening of the vehicle is a hand grasping handle.

4. The assembly according to claim 1, wherein said bottom surface of said second panel has a plurality of low friction strips affixed to said bottom surface of said second panel, said low friction strips running from said front end of said second panel to said back end of said second panel.

5. The assembly according to claim 1, wherein the means for facilitating the extending of the second panel through said tailgate access opening of the vehicle further comprises:
    means for moving and controlling movement of said second panel.

\* \* \* \* \*